(12) United States Patent
Suzuki et al.

(10) Patent No.: US 11,453,438 B2
(45) Date of Patent: Sep. 27, 2022

(54) ROTATION DETECTION DEVICE

(71) Applicant: DENSO CORPORATION, Kariya (JP)

(72) Inventors: Takahiro Suzuki, Kariya (JP); Masaya Taki, Kariya (JP); Toshihiro Fujita, Kariya (JP); Nobuyori Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 764 days.

(21) Appl. No.: 16/423,481

(22) Filed: May 28, 2019

(65) Prior Publication Data

US 2019/0367093 A1 Dec. 5, 2019

(30) Foreign Application Priority Data

May 30, 2018 (JP) .............................. JP2018-103869

(51) Int. Cl.

| | |
|---|---|
| *B62D 5/04* | (2006.01) |
| *B62D 15/02* | (2006.01) |
| *G01L 3/10* | (2006.01) |
| *G01L 5/22* | (2006.01) |
| *H02P 6/16* | (2016.01) |

(Continued)

(52) U.S. Cl.

CPC ......... *B62D 15/0235* (2013.01); *B62D 5/046* (2013.01); *B62D 5/049* (2013.01); *B62D 5/0487* (2013.01); *G01B 7/30* (2013.01); *G01D 5/145* (2013.01); *G01L 3/10* (2013.01); *G01L 5/221* (2013.01); *H02P 6/16* (2013.01); *H02P 27/06* (2013.01)

(58) Field of Classification Search

CPC .. B62D 15/0235; B62D 5/046; B62D 5/0487; B62D 5/049; G01B 7/30; G01L 3/10; H02P 6/16; H02P 27/06

See application file for complete search history.

(56) References Cited

U.S. PATENT DOCUMENTS

| | | | |
|---|---|---|---|
| 10,246,127 B2 * | 4/2019 | Kozawa | ............... B62D 5/0481 |
| 2001/0004849 A1 | 6/2001 | Jin et al. | |

(Continued)

FOREIGN PATENT DOCUMENTS

| | | |
|---|---|---|
| JP | H5-280999 A | 10/1993 |
| JP | 2003276635 A | 2/2003 |

(Continued)

OTHER PUBLICATIONS

U.S. Appl. No. 16/423,497, filed May 28, 2019, Takahiro Suzuki.
U.S. Appl. No. 16/423,478, filed May 28, 2019, Toshihiro Fujita.
U.S. Appl. No. 16/530,091, filed Aug. 2, 2019, Toshihiro Fujita.

*Primary Examiner* — Muhammad S Islam
(74) *Attorney, Agent, or Firm* — Maschoff Brennan

(57) ABSTRACT

An electric power steering apparatus has a rotation detection device for calculating an absolute angle that includes a sensor section that detects a rotation of a motor and outputs a mechanical angle and a count value. The rotation detection device also includes a signal acquisition unit that obtains the mechanical angle and the count value from the sensor section, and an absolute angle calculator that calculates an absolute angle based on the mechanical angle and the count value. Where one rotation of the motor is divided into indefinite regions and definite regions, the absolute angle calculator uses the count value from the definite regions to calculate the absolute angle.

8 Claims, 24 Drawing Sheets

(51) Int. Cl.
  *G01D 5/14*  (2006.01)
  *G01B 7/30*  (2006.01)
  *H02P 27/06* (2006.01)

(56) References Cited

U.S. PATENT DOCUMENTS

| | | |
|---|---|---|
| 2003/0051562 A1 | 3/2003 | Jin et al. |
| 2003/0051563 A1 | 3/2003 | Jin et al. |
| 2011/0257931 A1 | 10/2011 | Oberhauser |
| 2015/0239501 A1 | 8/2015 | Fujita et al. |
| 2016/0339946 A1* | 11/2016 | Kuramitsu ........... B62D 5/0421 |
| 2017/0291640 A1 | 10/2017 | Fujita et al. |
| 2018/0229761 A1* | 8/2018 | Fujita .................... B62D 5/049 |
| 2019/0006979 A1* | 1/2019 | Suzuki ................. B62D 5/0484 |
| 2019/0291775 A1 | 9/2019 | Taki et al. |

FOREIGN PATENT DOCUMENTS

| | | |
|---|---|---|
| JP | 2005-345375 A | 12/2005 |
| JP | 2012-163436 A | 8/2012 |
| JP | 5958572 B2 | 8/2016 |
| JP | 2017191092 A | 10/2017 |
| JP | 2017191093 A | 10/2017 |
| JP | 2018-103871 | 7/2018 |
| JP | 2018128429 A | 8/2018 |
| JP | 2019-022545 | 2/2019 |
| WO | WO 2019/181938 A1 | 9/2019 |

* cited by examiner

ROTATION DETECTION DEVICE

CROSS REFERENCE TO RELATED APPLICATION

The present application is based on and claims the benefit of priority of Japanese Patent Application No. 2018-103869, filed on May 30, 2018, the disclosure of which is incorporated herein by reference.

TECHNICAL FIELD

The present disclosure relates to a rotation detection device and an electric power steering apparatus using the rotation detection device.

BACKGROUND INFORMATION

A rotation angle detection device may detect a rotation position of a motor. More specifically, the rotation angle detection device may detect information that varies with the rotation of the motor.

Abnormalities and errors may occur during rotation calculations by the rotation angle detection device. As such, rotation angle detection devices are subject to improvement.

SUMMARY

The present disclosure describes a rotation detection device and an electric power steering apparatus using the rotation detection device. The rotation detection device of the present disclosure is configured to recover from an abnormality affecting the rotation detection device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
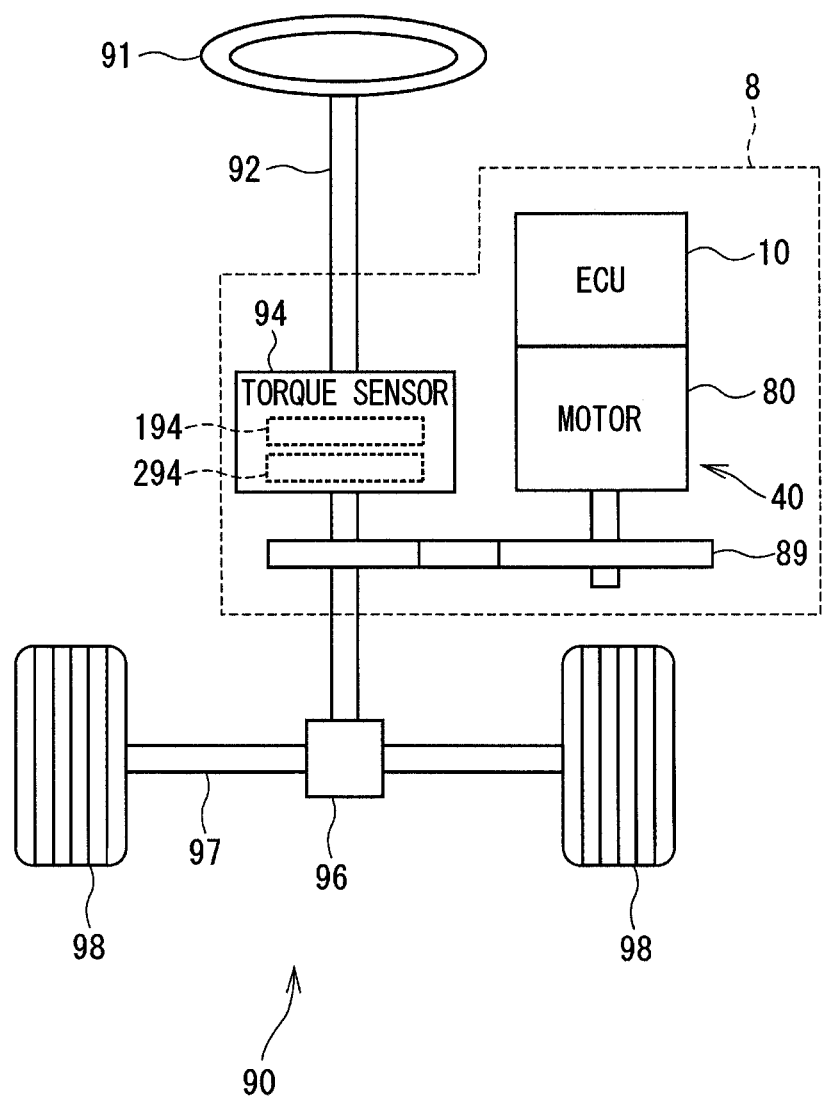
FIG. 1 illustrates a schematic configuration of a steering system according to a first embodiment.

The rotation angle detection device may detect information that varies with the rotation of a motor.

When calculating a value related to the number of rotations of a motor, the rotation angle detection device may count the rotation count up and down by comparing the rotation of the motor against a threshold value. The rotation count may be prone to errors and deviations, especially if there are errors and deviations in the threshold value. As such, in related technology rotation angle detection devices, the calculated number of rotations (i.e., the value related to the number of rotations) may be not usable in other calculations, because the calculated number of rotations may have errors. The rotation detection device of the present disclosure overcomes the calculation problems of the related technology.

First Embodiment

A rotation detection device and an electric power steering apparatus using such a rotation detection device are described below with reference to the drawings. In the following embodiments, like features and elements among the embodiments may be referred to by the same reference numerals, and a repeat description of previously described like features and elements may be omitted from the descriptions of the latter embodiments.

With reference to FIG. 1, an electronic control unit (ECU) 10 is configured as a rotation detection device in the first embodiment. The ECU 10 is included with a motor 80 as part of an electric power steering apparatus 8 for assisting with a steering operation of a vehicle. The motor 80 may also be referred to as a rotating electric machine. FIG. 1 shows an overall configuration of a steering system 90 including the electric power steering apparatus 8. The steering system 90 includes a steering wheel 91, a steering shaft 92, a pinion gear 96, a rack shaft 97, road wheels 98, and the electric power steering apparatus 8.

The steering wheel 91 is disposed at one end of the steering shaft 92 and connected to the steering shaft 92. A torque sensor 94 is included on the steering shaft 92 to detect a steering torque Ts. The torque sensor 94 includes a first torque detector 194 and a second torque detector 294. The pinion gear 96 is disposed at the other end of the steering shaft 92. The pinion gear 96 engages with the rack shaft 97. Road wheels 98 are coupled at both ends of the rack shaft 97 via a mechanical linkage such as tie rods.

When a driver of the vehicle rotates the steering wheel 91, the steering shaft 92 connected to the steering wheel 91 rotates. The pinion gear 96 converts the rotational motion of the steering shaft 92 into a linear motion for linearly moving the rack shaft 97. The road wheels 98 are steered to an angle corresponding to the displacement amount of the rack shaft 97.

The electric power steering apparatus 8 includes a drive device 40, which includes the motor 80, the ECU 10, and a speed-reduction gear 89. The speed-reduction gear 89 is a power transmission mechanism that reduces the rotation speed of the motor 80 and transmits the rotation to the steering shaft 92. The electric power steering apparatus 8 of the present embodiment is a column assist-type power steering apparatus. However, the electric power steering apparatus 8 is not limited to being a column assist-type electric power steering apparatus 8, and the electric power steering apparatus 8 may alternatively be a rack assist-type electric power steering apparatus 8 that transmits the rotation of the motor 80 to the rack shaft 97.

The motor 80 outputs an assist torque to assist with a steering operation. In other words, the motor 80 may either provide a whole or partial assist to assist a vehicle user in turning the steering shaft 92 to steer the road wheels 98.

Figure 2:
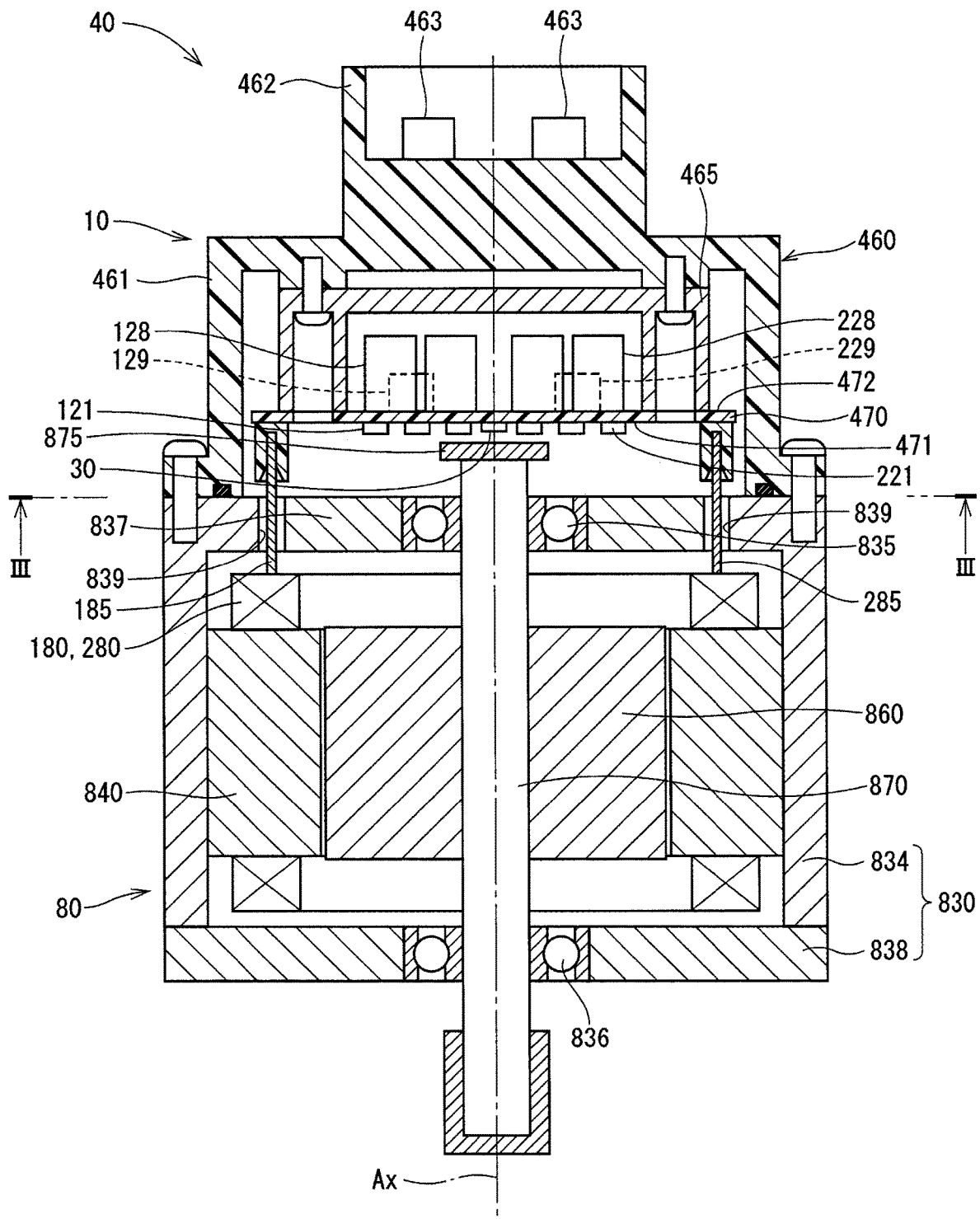
FIG. 2 illustrates a cross-sectional view of a drive device in the first embodiment.
Figure 3:
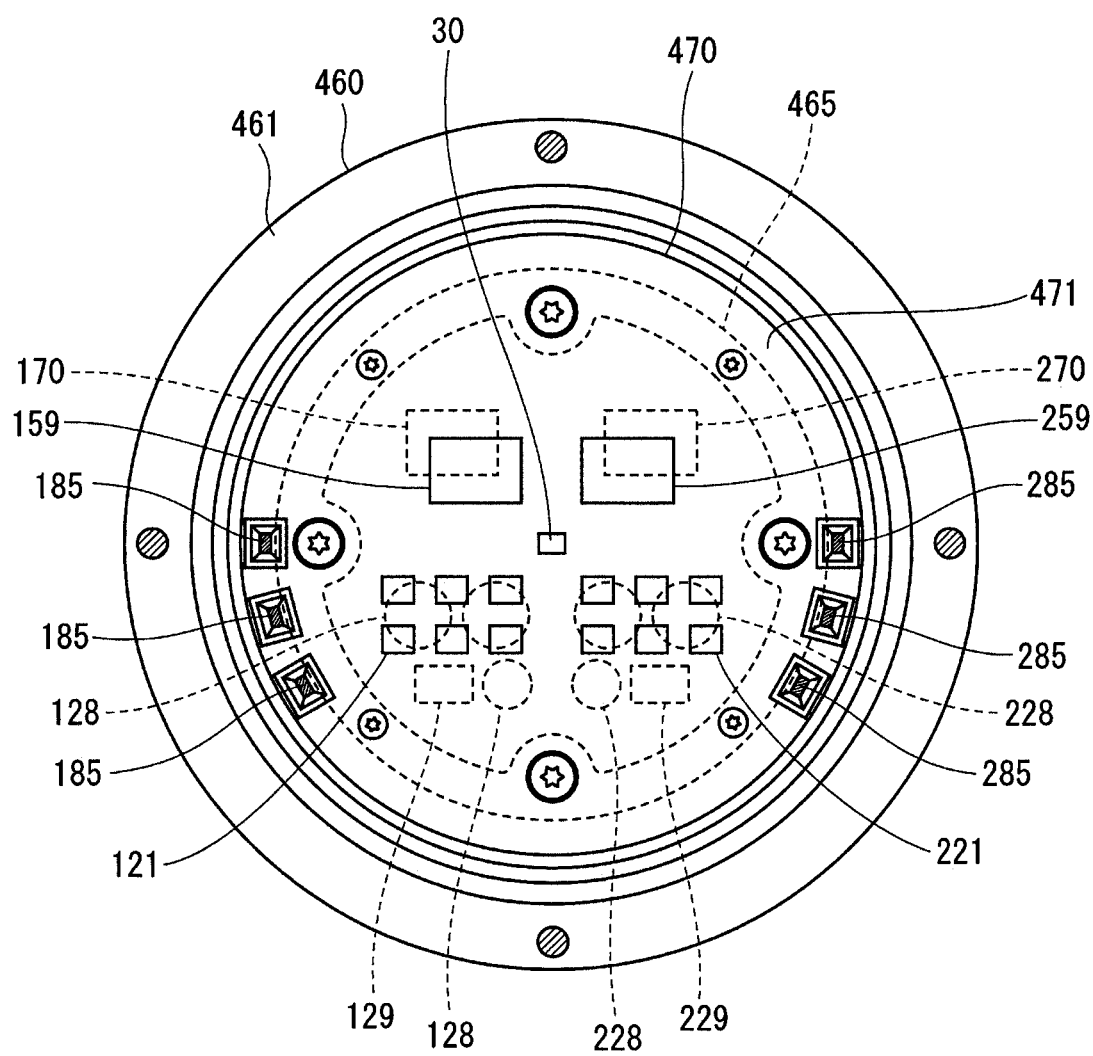
FIG. 3 illustrates a cross-sectional view of the drive device taken along a line III-Ill in FIG. 2.

The motor 80 is shown in greater detail in FIGS. 2 and 3. The motor 80 is driven by electric power supplied from batteries 191 and 291 shown in FIG. 4 as a direct current power supply. Driving the motor 80 in forward and reverse directions causes the speed-reduction gear 89 shown in FIG. 1 to respectively rotate in forward and reverse directions. The motor 80 is a three-phase brushless motor and has a rotor 860 and a stator 840, as shown in FIG. 2.

The motor 80 has a first motor winding 180 as a first winding set, and a second motor winding 280 as a second winding set. The motor windings 180 and 280 have the same electrical characteristics. For example, the motor windings 180 and 280 are commonly wound on the stator 840 so that the phases of the winding 180 are shifted by an electrical angle of 30 degrees from the corresponding phases of the winding 280. As such, the phase currents (e.g., U phase, V phase, and W phase) are controlled to be supplied to the motor windings 180 and 280 such that the corresponding phase currents of the motor windings 180 and 280 have a phase difference φ of 30 degrees. By optimizing the current supply phase difference, the output torque is improved and the sixth-order torque ripple harmonic can be reduced. Supplying the current with a 30 degree phase difference φ among the corresponding phases of the motor windings 180 and 280 also averages the current, thereby advantageously maximizing the cancellation of noise and vibration. Since heat generation is also averaged, it is also possible to reduce errors in the torque value detection by the torque sensors 194 and 294, as the detected torque values may vary with temperature.

Figure 4:
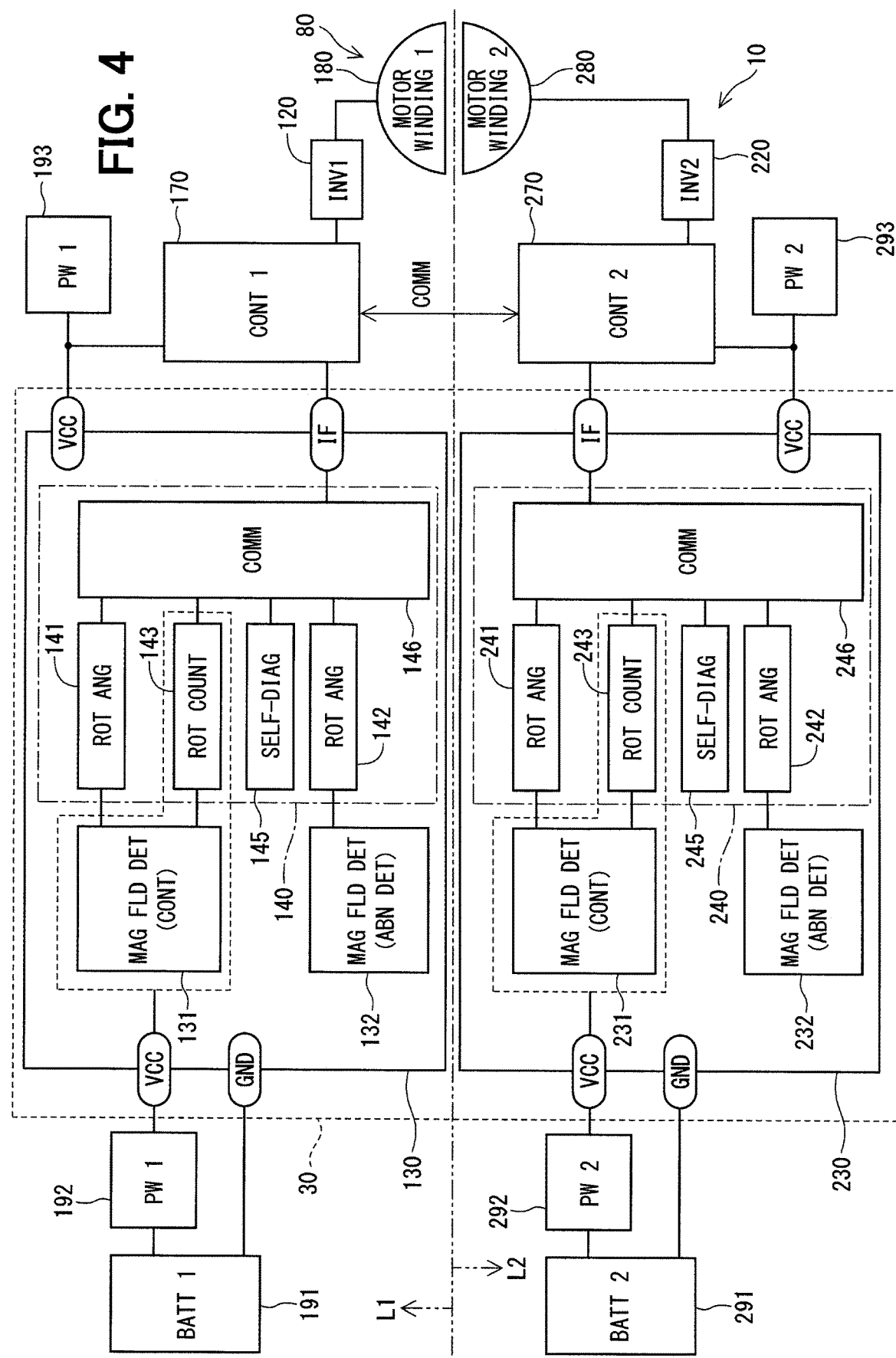
FIG. 4 illustrates a block diagram of an electronic control unit (ECU) in the first embodiment.

With reference to FIG. 4, the combination of a first driver circuit 120, a first sensor section 130, and a first control section 170, among other elements, may be referred to as a first system L1. The first system L1 is used to control the drive of the first motor winding 180 (e.g., by controlling the power supplied to the first motor winding 180). The combination of a second driver circuit 220, a second sensor section 230, and a second control section 270, among other elements, may be referred to as a second system L2. The second system L2 is used to control the drive of the second motor winding 280. Elements, components, and features included in the first system L1 may be indicated by reference numerals with a base of 100 (e.g, 120, 170), and the elements, components, and features included in the second system L2 may be indicated by reference numerals with a base of 200. Like elements and features between the first system L1 and second system L2 may be indicated by the least two significant digits. For example, the first control section 170 may be similar to the second control section 270 (e.g., the control sections 170 and 270 are like components), where the reference characters for each of the control sections 170 and 270 include "70" as their least significant digits, the prefix "1" (i.e., the most significant digit) for the first control section 170 indicates that the first control section 170 is included in the first system L1, and the prefix "2" indicates that the second control section 270 is included in the second system L2. The description of the first control section 170 and the second control section 270 may be similar, and in such case, a redundant description of like elements, components, and features may be omitted.

The drive device 40 may integrate the ECU 10 and the motor 80 together within a single package. As such, the drive device 40 may be referred to as a machine-electronics integrated-type drive device 40. As shown in FIG. 2, the ECU 10 may be disposed coaxially with the motor 80 at one end of the motor 80 along the longitudinal axis Ax (i.e., on an axial end of the motor 80). Alternatively, the motor 80 and the ECU 10 may be provided separately. The ECU 10 is positioned on the side opposite to the output of a shaft 870. Alternatively, the ECU 10 may be disposed on the output shaft side of the motor 80. By adopting the machine-electronics integrated-type configuration, the drive device 40 including the ECU 10 and the motor 80 may be installed in more restricted spaces (e.g., smaller, narrower spaces) in the vehicle.

The motor 80 includes the stator 840, the rotor 860, and a housing 830 that houses the stator 840 and the rotor 860 on the inside of the housing 830. The stator 840 is fixed to the housing 830, and the motor windings 180 and 280 are wound on the stator 840. The rotor 860 is disposed inside the stator 840. In other words, the stator 840 may surround the rotor 860. The rotor 860 can rotate relative to the stator 840.

The shaft 870 is fitted in the rotor 860 to rotate integrally with the rotor 860. The shaft 870 is rotatably supported by the housing 830 by bearings 835 and 836. The end portion of the shaft 870 on the ECU 10 side protrudes from the housing 830 toward the ECU 10. A magnet 875 is included at the axial end of the shaft 870 on the ECU 10 side The housing 830 includes a cylindrical-shaped case 834 with a rear frame end 837 that relatively closes the side of the case 834 near the ECU 10. A front frame end 838 is included and attached on the open side of the case 834 to relatively close the side of the case 834 near the output of the shaft 870. The case 834 and the front frame end 838 are fastened to each other by bolts or like fasteners (not shown). Lead wire insertion holes 839 are formed in the rear frame end 837. Lead wires 185 and 285 connected to each phase of the motor windings 180 and 280 are inserted through the lead wire insertion holes 839. The lead wires 185 and 285 pass through the lead wire insertion holes 839 toward the ECU 10 and connect to a circuit board 470.

The ECU 10 includes a cover 460, a heat sink 465, the circuit board 470, and other electronic components mounted on the circuit board 470. The heat sink 465 may be fixed to the cover 460, and the circuit board 470 may be fixed to the heat sink 465.

The cover 460 protects the electronic components of the ECU 10 from external impacts and prevents the ingress of dust and water into the inside of the ECU 10. The cover 460 includes an integrally formed cover main body 461 and a connector member 462. The connector member 462 and the cover main body 461 need not be integrally formed and may be alternatively included as two separate structural members 461 and 462. The terminals 463 of the connector member 462 are connected to the circuit board 470 via wiring or like electrical conductors (not shown). The number of connector members 462 and the number of terminals may correspond to the number of electrical inputs and outputs (e.g., power, signals) to and from the ECU 10, as well as being based on other design factors. The connector member 462 is disposed at one axial end of the drive device 40 on the side opposite the motor 80. The connector member 462 extends axially away from the drive device 40 in the direction of the axis Ax and is open to allow for an external connector (not shown) to connect to the connector member 462.

The circuit board 470 is, for example, a printed circuit board, and is positioned with one side facing the rear frame end 837 toward the motor 80, and another side facing away from the motor 80 toward the cover 460. The electronic components of the first and second systems L1 and L2 shown in FIG. 4 are mounted independently on the circuit board 470 so that the two systems are provided in a fully redundant configuration. In the present embodiment, the electronic components of the first and second systems L1 and L2 are mounted on one circuit board 470, but the electronic components of the first and second systems L1 and L2 may be alternatively mounted on separate circuit boards. Not all of the electronic components from the first and second systems L1 and L2 may be mounted on the circuit board, and FIGS. 2 and 3 may not illustrate all of the electronic components shown in FIG. 4 as being on the circuit board 470. The electronic components from the first and second systems L1 and L2 on the circuit board 470 are described below in greater detail.

Of the two principal surfaces of the circuit board 470, the surface on the side of the motor 80 is referred to as a motor side surface 471 and the other surface facing the cover 460 is referred to as a cover side surface 472. As shown in FIG. 3, switching elements 121, switching elements 221, a rotation angle sensor 30, and custom integrated circuits (ICs) 159 and 259 are mounted on the motor side surface 471. The rotation angle sensor 30 is mounted at a position facing the magnet 875 so as to be able to detect a change in the magnetic field caused by rotation of the magnet 875. The rotation angle sensor 30 may be disposed centrally on the motor side surface 471 of the circuit board 470 as shown in FIG. 3 so that the rotation angle sensor is disposed coaxially with the shaft 870, and thus the magnet 875, along the axis Ax, for example, as shown in FIG. 2. The rotation angle sensor 30 may be referred to as the sensor section 30.

The switching elements 121 may make up part of the first driver circuit 120 shown in FIG. 4 (e.g., inverter 1). The switching elements 221 may make up part of the second driver circuit 220 shown in FIG. 4 (e.g., inverter 2).

Capacitors 128 and 228, inductors 129 and 229, and the control sections 170 and 270 are mounted on the cover side surface 472.

Small computers such as microcontrollers or systems on a chip (SoCs) may form control sections 170 and 270 with a separate computer forming each of the control sections 170 and 270. In other words, the control section 170 may be a microcontroller or SoC and the control section 270 may be another microcontroller or SoC. In FIG. 3, reference numerals 170 and 270 are assigned to the computers that are respectively part of the control sections 170 and 270.

The capacitors 128 and 228 respectively smooth electrical power from the batteries 191 and 291 shown in FIG. 4. The capacitors 128 and 228 also assist the electric power supply to the motor 80 by storing electric charge. The capacitors 128 and 228 and the inductors 129 and 229 may be configured to form a filter circuit. For example, the capacitor 128 and the inductor 129 may be combined to form an LC filter for the first system L1. The capacitor 228 and the inductor 229 may be combined to form an LC filter for the second system L2. The filter circuits reduce noise transmitted from other devices that share the batteries 191 and 291, and also reduce noise transmitted from the drive device 40 to the other devices sharing the batteries 191 and 291.

The power supply relays, motor relays, and current sensors (all not shown in the drawings) may also either be mounted on the motor side surface 471 or on the cover side surface 472.

As shown in FIG. 4, the ECU 10 includes the driver circuits 120 and 220, and the control circuits 170 and 270. In FIG. 4, the driver circuit is described as "INV." The first driver circuit 120 is a three-phase inverter having six switching elements 121. The first driver circuit 120 converts the electric power supplied to the first motor winding 180 (e.g., converts the direct current (DC) power from the battery 191 to an alternating current (AC) power). The switching elements 121 are controlled to turn on and off based on control signals from the first control section 170. The second driver circuit 220 is a three-phase inverter having six switching elements 221. The second driver circuit 220 converts the electric power supplied to the second motor winding 280. The switching elements 221 are controlled to turn on and off based on control signals from the second control section 270.

As shown in FIG. 4, the rotation angle sensor 30 includes the first sensor section 130 and the second sensor section 230. The first sensor section 130 outputs an output signal SGN1 to the first control section 170, and the second sensor section 230 outputs an output signal SGN2 to the second control section 270. That is, in the present embodiment, the first sensor section 130 is included in the first system L1, and the second sensor section 230 is included in the second system L2.

Unless described otherwise, the configurations of components and elements in the ECU 10, the rotation angle sensor 30, and the drive device 40, as described in the present embodiment, may be the same or substantially similar for the latter embodiments.

The first sensor section 130 includes magnetic field detection units 131 and 132 and a signal processing unit 140. The second sensor section 230 includes magnetic field detection units 231 and 232 and a signal processing unit 240. Since the processes performed by the sensor sections 130 and 230 are the same, the description focuses on the details of the process performed by the first sensor section 130 and omits a similar description for the second sensor section 230.

The magnetic field detection units 131, 132, 231, and 232 are detection elements that detect changes in the magnetic field of the magnet 875 based on the rotation of the motor 80 (e.g., via the rotation of the rotor 860 and the shaft 870). A magnetoresistance (MR) sensor or a Hall sensor may be used, for example, as the magnetic field detection units 131, 132, 231, and 232. The magnetic field detection units 131, 132, 231, and 232 each have four sensor elements that output a cos+ signal, a sin+ signal, a cos−signal, and a sin−signal. The cos+ signal, the sin+ signal, the cos−signal, and the sin−signal, either collectively or individually, may refer to the sensor signal. Similarly, the sensor signal may refer to any or all of the cos+ signal, the sin+ signal, the cos−signal, and the sin−signal.

The signal process unit 140 includes rotation angle calculators 141 and 142, a rotation count unit 143, a self-diagnostic unit 145, and a communicator 146. The signal process unit 240 includes rotation angle calculators 241 and 242, a rotation count unit 243, a self-diagnostic unit 245, and a communicator 246.

The rotation angle calculator 141 calculates a mechanical angle θm1c based on the sensor signal from the magnetic field detection unit 131. The rotation angle calculator 142 calculates the mechanical angle θm1e based on the sensor signal from the magnetic field detection unit 132. The rotation angle calculator 241 calculates the mechanical angle θm2c based on the sensor signal from the magnetic field detection unit 231. The rotation angle calculator 242 calculates the mechanical angle θm2e based on the sensor signal from the magnetic field detection unit 232. The mechanical angles θm1c, θm1e, θm2c, and θm2e are calculated from the arc tangent of the cos+ signal, the sin+ signal, the cos− signal, and the sin− signal.

In the present embodiment, the mechanical angles θm1c and θm2c are respectively calculated based on the detection signals (i.e., sensor signals) from the magnetic field detection units 131 and 231 and are used for various calculations in the control sections 170 and 270. The calculated mechanical angles θm1e and θm2e are respectively based on the detection signals (i.e., sensor signals) of the magnetic field detection units 132 and 232 and are used to detect abnormalities by respectively comparing the mechanical angles θm1e and θm2e with the mechanical angles θm1c and θm2c. The magnetic field detection units 131 and 231 may be used for purposes of control and are configured "for control," and the magnetic field detection units 132 and 232 may be used for purposes of abnormality detection and are configured "for abnormality detection." Values calculated by the rotation angle calculators 141, 142, 241, and 242 may be any values that can be converted into mechanical angles.

The magnetic field detection units 131 and 231 for control and the magnetic field detection units 132 and 232 for abnormality detection may be the same type of magnetic field detection units or be different types. Since the magnetic field detection accuracy for abnormality detection may be much lower than the magnetic field detection accuracy for control, the detection accuracy of the magnetic field detection units 132 and 232 used for abnormality detection may be lower than the detection accuracy of the magnetic field detection units 131 and 231 used for control. By using different types of magnetic field detection devices for control and abnormality detection, the likelihood of the magnetic field detection units malfunctioning at the same time is decreased. When using the same magnetic field detection elements for the magnetic field detection 131, 132, 231, and 232, it may be possible to vary the layout and configuration of the magnetic field detection units or select detection elements from different manufacturing lots to decrease the possibility of malfunctions occurring at the same time. The calculation circuits of the rotation angle calculators 141, 142, 241, and 242 may be varied in a like manner to reduce the likelihood of circuit malfunctions occurring at the same time.

The rotation count unit 143 calculates a count value TC1 based on the signal from the magnetic field detection unit 131. The rotation count unit 243 calculates a count value TC2 based on the signal from the magnetic field detection unit 231.

Figure 6:
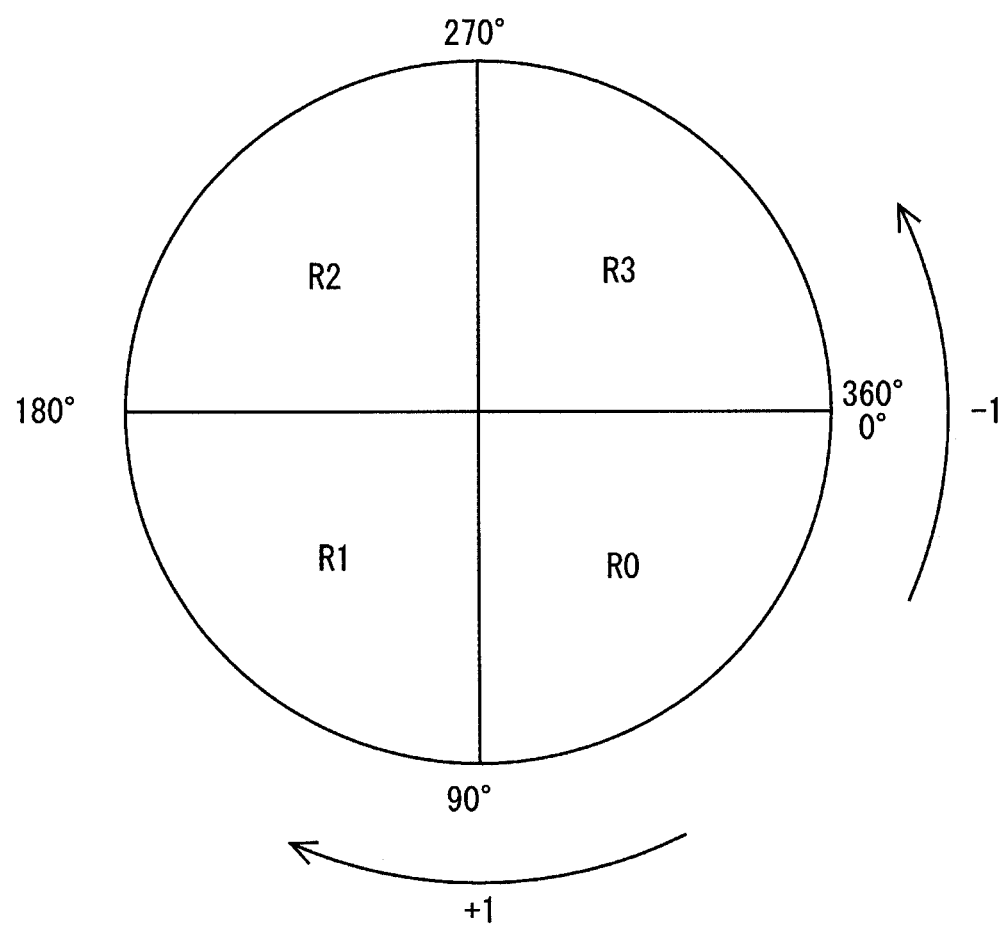
FIG. 6 illustrates regions in one rotation of a motor in the first embodiment.

As shown in FIG. 6, in one rotation of the motor 80, the mechanical angle θm takes a value of 0° to 360°, and four count regions are set. The position where the mechanical angle θm switches from 360° to 0° is set as a rotation angle switch position. In the drawings, the rotation angle switch position is illustrated as 0° and the 360° label is omitted. In the present embodiment, the mechanical angle θm equal to or greater than 0° and less than 90° is referred to as "region R0," the mechanical angle θm equal to or greater than 90° and less than 180° is referred to as "region R1," the mechanical angle θm equal to or greater than 180° and less than 270° is referred to as "region R2," and the mechanical angle θm equal to or greater than 270° and less than 360° is referred to as "region R3." Each time the mechanical angle θm changes from one region to the other, the count values TC1 and TC2 either count up or down based on the rotation direction. In the present embodiment, the count values TC1 and TC2 count up when the motor 80 rotates in a forward direction, and count down when the motor 80 rotates in a reverse direction. That is, when the motor 80 makes one rotation in the forward direction, e.g., from 0° to 360°, the count values TC1 and TC2 respectively count up and increase by 4. When the motor 80 makes one rotation in the reverse direction, e.g., from 360° to 0°, the count values TC1 and TC2 respectively count down and decrease by 4.

As shown in FIG. 4, the self-diagnostic unit 145 monitors for abnormalities such as short circuits at the power source(s) or for ground faults in the first sensor section 130. The communicator 146 generates a first output signal SGN1 and transmits the first output signal SGN1 to the first control section 170. The first output signal SGN1 includes various signals such as the mechanical angles θm1c and θm1e, the count value TC1, and the self-diagnostic result. The first output signal SGN1 may include additional signals. The self-diagnostic unit 245 monitors for abnormalities in the second sensor section 230. The communicator 246 generates the second output signal SGN2 and transmits the second output signal SGN2 to the second control section 270. The second output signal SGN2 includes various signals such as the mechanical angles θm2c and θm2e, the count value TC2, and the self-diagnostic result. The second output signal SGN2 may include additional signals. The output signal of the present embodiment is a digital signal, and the communication method may use, for example, a serial peripheral interface (SPI) communication specification, but other communication methods may also be used.

Electric power is supplied from the first battery 191 to the first sensor section 130 via the power supplies 192 and 193. The power supplies 192 and 193 may be regulators or like controllers. Electric power is constantly supplied via the power supply 192 to the magnetic field detection unit 131 and the rotation count unit 143. The magnetic field detection unit 131 and the rotation count unit 143 are surrounded by a dashed line to indicate that these components are constantly supplied with power via the power source 192 and continued to be supplied with power for the purposes of continual detection and calculation even when the vehicle ignition switch is turned off. In the first sensor section 130, components other than the magnetic field detection unit 131 and the rotation count unit 143 are supplied with electric power via the power supply 193 when the vehicle ignition switch (not shown) is turned on. When the ignition switch is turned off, the power supply to these components is stopped. Electric power is also supplied to the first control section 170 via the power supply 193 when the ignition switch is turned on. The vehicle ignition switch may also be referred to as a start switch.

Electric power is supplied from the second battery 291 to the second sensor section 230 via the power supplies 292 and 293. Electric power is constantly supplied via the power supply 292 to the magnetic field detection unit 231 and the rotation count unit 243. The magnetic field detection unit 231 and the rotation count unit 243 are surrounded by a dashed line to indicate that these components are constantly supplied with power via the power source 292 and continued to be supplied with power for the purposes of continual detection and calculation even when the vehicle ignition switch is turned off. In the second sensor section 230, components other than the magnetic field detection unit 231 and the rotation count unit 243 are supplied with electric power via the power supply 293 when the vehicle ignition switch is turned on. When the ignition switch is turned off, the power supply to these components is stopped. Electric power is also supplied to the second control section 270 via the power supply 293 when the ignition switch is turned on.

A low power consumption element, such as a tunnel magnetoresistance (TMR) element may be used for the magnetic field detection units 131 and 231 that receive a continuous power supply. To simplify the description, detailed descriptions of some wiring and control lines, such as the connection line between the battery 191 and the power supply 193, may be omitted. The description, with reference to other figures, may similarly omit a detailed description of electrical connections between electrical components.

The rotation count units 143 and 243 may alternatively calculate the count values TC1 and TC2 based on the signals of the magnetic field detection units 132 and 232, instead of using the signals from the magnetic field detection units 131 and 231. In this case, electric power may be continuously supplied to the magnetic field detection units 132 and 232.

As described above, each of the control sections 170 and 270 may be a small computer such as a microcontroller or an SoC that includes, for example, one or more CPUs or like processor cores, memory such as read-only memory (ROM), random-access memory (RAM) and flash memory, input/output (I/O) peripherals, and a bus line for connecting these components. The processes executed by the control sections 170 and 270 may be implemented as a software process, a hardware process, or as a combination of software and hardware. The software process may be implemented by causing the CPU to execute a program or instruction set stored in memory. The program may be stored beforehand in a memory such as the ROM. The memory for storing the program/instruction set is a computer-readable, non-transitory, tangible storage medium. The hardware process may be implemented by a special purpose electronic circuit. For example, in addition to the computers that make up the control sections 170 and 270, the control sections 170 and 270 may include other hardware components that form specialized circuits for performing the processes associated with the control sections 170 and 270. Such circuits may include, for example, analog circuit components, digital circuit components, logical circuit components, or a combination of these circuit components configured to perform the processes associated with the control sections 170 and 270. In another example, the control sections 170 and 270 may include one or more specialized circuits such as application-specific integrated controllers (ASICs) or field-programmable gate arrays (FPGAs) configured to perform the processes associated with the control sections 170 and 270.

[0041]
The first control section 170 and the second control section 270 are configured to communicate with each other for intercommunication between the control sections 170 and 270. The communication between the control sections 170 and 270 may be referred to as an "inter-computer communication." Any communication method such as a serial communication like SPI or SENT, CAN communication, FlexRay communication or the like may be employed for the inter-computer communication between the control sections 170 and 270.

The first control section 170 generates control signals to control the turning on and off of the switching elements 121 in the driver circuit 120 for current feedback control. The control signals for current feedback control may be based, for example, on the mechanical angle θm1c, the detection values of the current sensor (not illustrated), or other sensor signals. The second control section 270 generates control signals to control the turning on and off of the switching elements 221 in the driver circuit 220 for current feedback control. The control signals for current feedback control may be based, for example, on the mechanical angle θm2c, the detection values of the current sensor (not illustrated), or other sensor signals. When the mechanical angles are used for the current feedback control, the mechanical angles θm1c and θm2c are converted to electrical angles.

Figure 5:
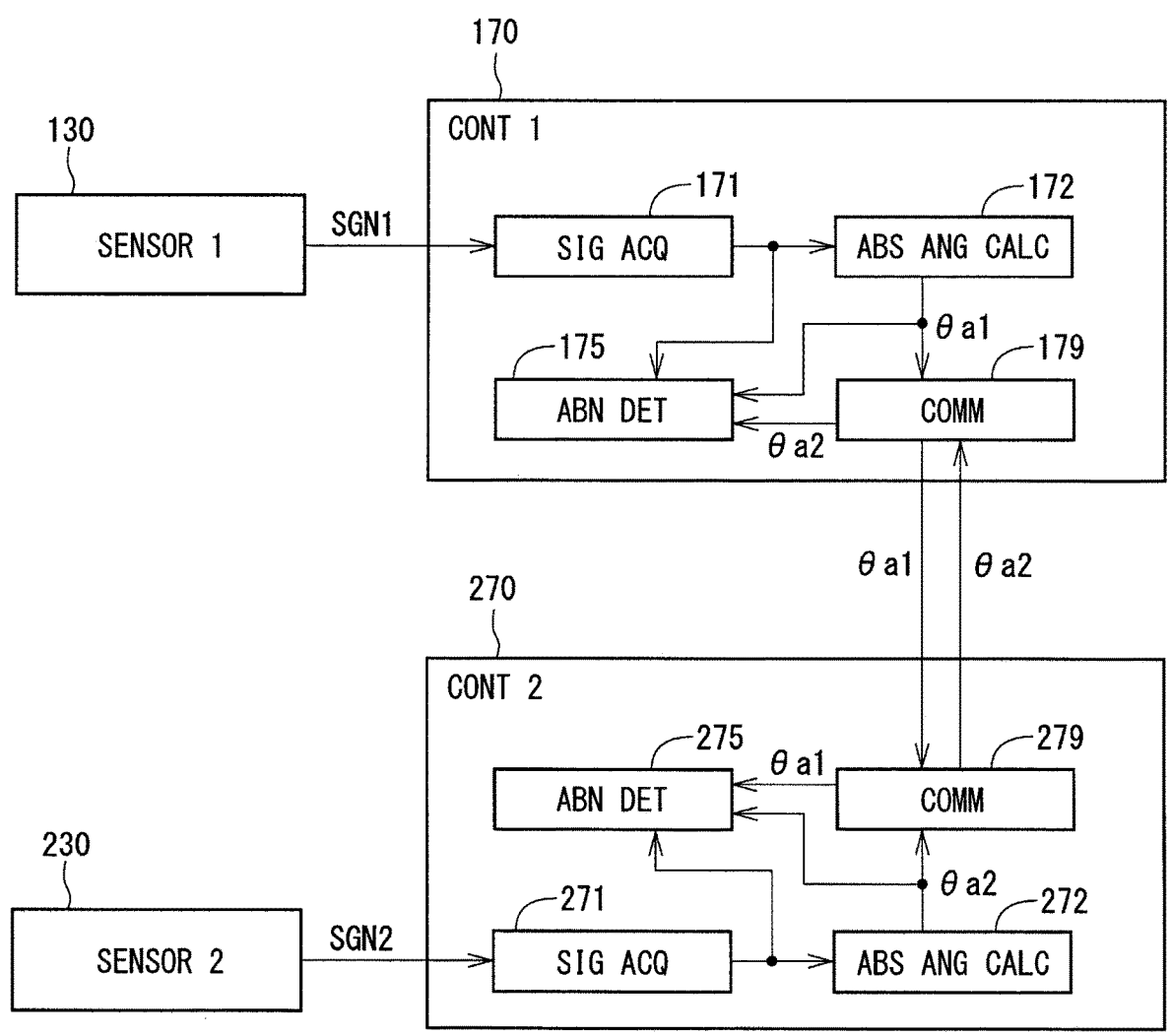
FIG. 5 illustrates a block diagram of a control section in the first embodiment.

As shown in FIG. 5, the first control section 170 includes a signal acquisition unit 171, an absolute angle calculator 172, an abnormality determiner 175, and a communicator 179. The second control section 270 includes a signal acquisition unit 271, an absolute angle calculator 272, an abnormality determiner 275, and a communicator 279.

As described above, the first control section 170 and the second control section 270 may be microcontrollers, SoCs, or like computers. The first control section 170 and second control section 270 may also include specialized circuits such as ASICs of FPGAs. The signal acquisition unit 171, absolute angle calculator 172, abnormality determiner 175, and communicator 179 elements in the first control section 170 may be realized as specialized hardware circuits (e.g., ASICs, FPGAs) configured to perform the processes associated with each of these elements. Alternatively, the processes associated with each of these elements may be performed by the control section 170 as a microcontroller, where the signal acquisition unit 171, absolute angle calculator 172, abnormality determiner 175, and communicator 179 shown in FIG. 5 represent functional blocks or processes performed by the control section 170.

The same hardware/software realization applies to the signal acquisition unit 271, absolute angle calculator 272, abnormality determiner 275, and communicator 279 elements of the second control section 270. That is, the elements of the second control section may be realized as specialized hardware circuits or represent function blocks of processes performed by the second control section 270 when these elements are realized as software, hardware, or a software/hardware combination.

The signal acquisition unit 171 acquires the first output signal SGN1 from the first sensor section 130. The signal acquisition unit 271 acquires the second output signal SGN2 from the second sensor section 230. The absolute angle calculator 172 calculates the absolute angle θa1 using the mechanical angle θm1c and the count value TC1. The absolute angle calculator 272 calculates the absolute angle θa2 using the mechanical angle θm2c and the count value TC2. The absolute angles θa1 and θa2 are, respectively, an amount of rotation from the reference position. The absolute angles θa1 and θa2 can be converted to a steering angle θs, which is the rotation angle of the steering shaft 92, by using the gear ratio of the speed-reduction gear 89. The absolute angles θa1 and θa2 may also be used for calculations other than the steering angle. The communicators 179 and 279 both transmit the absolute angles θa1 and θa2 as angle information to each other (i.e., mutual communication between communicators 179 and 279).

The abnormality determiner 175 can determine abnormalities in the first system L1 based on the comparison result of the mechanical angles θm1c and θm1e and the self-diagnostic result acquired from the first sensor section 130. The abnormality determiner 175 can also determine abnormalities in the first system L1 by comparing the absolute angles θa1 and θa2. The abnormality determiner 275 can determine abnormalities in the second system L2 based on the comparison result of the mechanical angles θm2c, θm2e and the self-diagnostic result acquired from the second sensor section 230. The abnormality determiner 275 can also determine abnormalities by comparing the absolute angles θa1 and θa2. When an abnormality is determined, the calculation of the absolute angles θa1 and θa2 is stopped.

In the present embodiment, if one of the first and second systems is normal, the normal system continues to calculate the absolute angle. When an abnormality determination is made by comparing the absolute angles θa1 and θa2, the calculation of the absolute angles θa1 and θa2 is stopped. Unless described otherwise, e.g., describing that the first system has an abnormality, the description assumes that the first system and the second system are both normal.

In the present embodiment, the same calculations are performed in both of the systems L1 and L2. In describing the calculations between the two systems, the calculation references may use "1" and "2" in the calculation labels to respectively distinguish between the first system L1 and the second system L2. As described above, the mechanical angles θm1c and θm2c for control may be used for various other calculations. In the description of various other calculations, the subscript "c" indicating "for control" may be omitted. The same conventions may be applied to the latter described embodiments.

Figure 7:
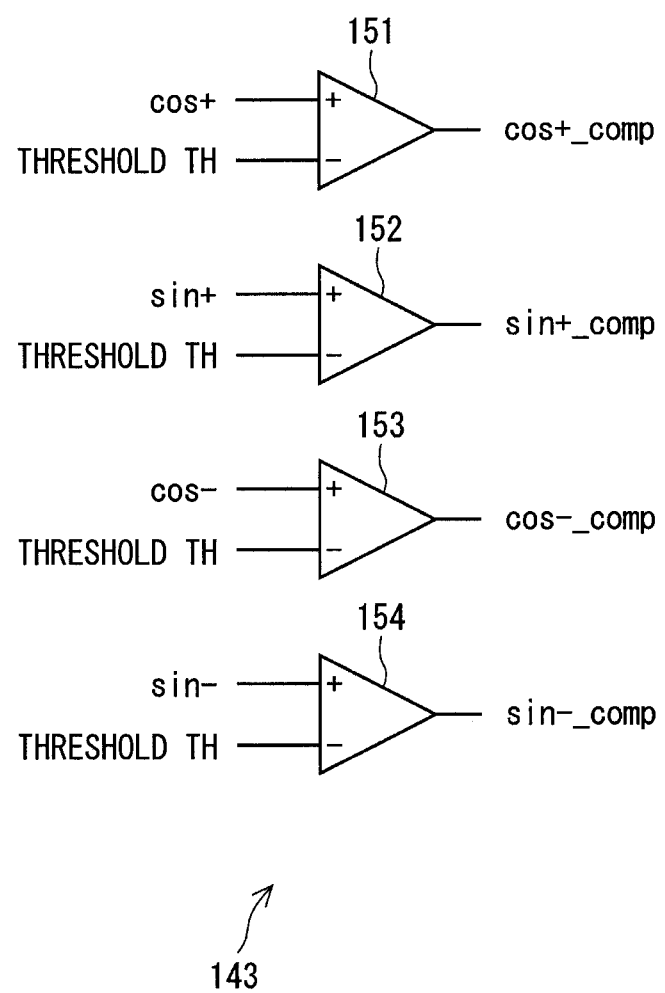
FIG. 7 illustrates a circuit diagram showing a rotation count unit in the first embodiment.

As shown in FIG. 7, the rotation count unit 143 includes comparators 151, 152, 153, and 154 (i.e., 151-154).

For the comparator 151, the cos+ signal is input to a non-inverted terminal and a threshold TH is input to an inverted terminal. The comparator 151 outputs a Lo or Hi cos+ comparison signal (i.e., outputs either a low level or high level cos+ comparison signal). That is, when the cos+ signal is larger than the threshold TH, the comparator 151 outputs a Hi level cos+ comparison signal, and when the cos+ signal is smaller than the threshold TH, the comparator 151 outputs a Lo level cos+ comparison signal.

For the comparator 152, the sin+ signal is input to a non-inverted terminal and a threshold TH is input to an inverted terminal. The comparator 152 outputs a Lo or Hi sin+ comparison signal. That is, when the sin+ signal is larger than the threshold TH, the comparator 152 outputs a Hi level sin+ comparison signal, and when the sin+ signal is smaller than the threshold TH, the comparator 152 outputs a Lo level sin+ comparison signal.

For the comparator 153, the cos− signal is input to a non-inverted terminal and a threshold TH is input to an inverted terminal. The comparator 153 outputs a Lo or Hi cos− comparison signal. That is, when the cos− signal is larger than the threshold TH, the comparator 153 outputs a Hi level cos− comparison signal, and when the cos− signal is smaller than the threshold TH, the comparator 153 outputs a Lo level cos− comparison signal of Lo.

For the comparator 154, the sin− signal is input to a non-inverted terminal and a threshold TH is input to an inverted terminal. The comparator 154 outputs a Lo or Hi sin− comparison signal. That is, when the sin− signal is larger than the threshold TH, the comparator 154 outputs a Hi level sin− comparison signal, and when the sin− signal is smaller than the threshold TH, the comparator 154 outputs a Lo level sin− comparison signal.

The thresholds TH input to the comparators 151-154 can be arbitrarily set. The count value TC may be calculated by methods other than: (i) a mutual comparison of the cos+ signal, sin+ signal, cos− signal, and sin− signal output signals; and (ii) a threshold comparison using a logical operation of the cos+ signal, sin+ signal, cos− signal, and sin− signal output signals In the drawings, a cos+ comparison signal is labeled as "cos+_comp," a sin+ comparison signal as "sin+_comp," a cos− comparison signal as "cos−_comp," and a sin− comparison signal as "sin−_comp."

The rotation count unit 243 in the second system L2 is configured similarly to the configuration of the rotation count unit 143 of the first system L1, as described above and shown in FIG. 7. As such, a description of the rotation count unit 243 similar to the description for the rotation count unit 143, and illustrations of the comparators in the rotation count unit 243 are omitted.

Figure 8:
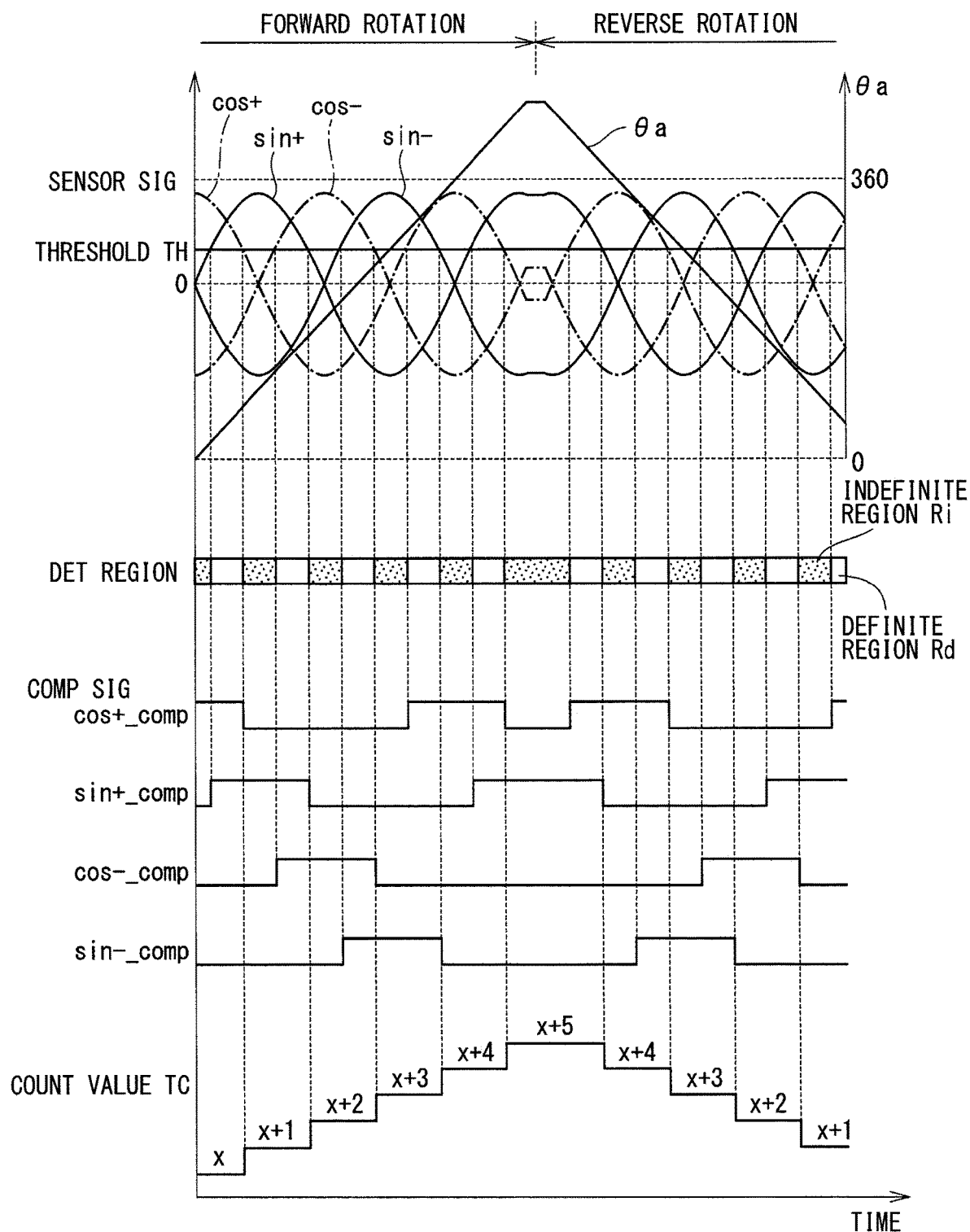
FIG. 8 is a time chart showing a sensor signal, an absolute angle, a determination region, a comparison signal, and a count value in the first embodiment.

FIG. 8 illustrates, in order from top to bottom, the sensor signal and the absolute angle θa, a determination region, the comparison signal, and the count value TC.

In the present embodiment, as shown in FIG. 8, when the comparison signal of the comparators 151-154 falls from a Hi level to a Lo level, the count value TC1 is counted up (i.e., incremented) when the motor 80 rotates in the forward direction, and counted down (i.e., decremented) when the motor 80 rotates in the reverse direction. The direction of rotation shall be determined separately.

Figure 9:
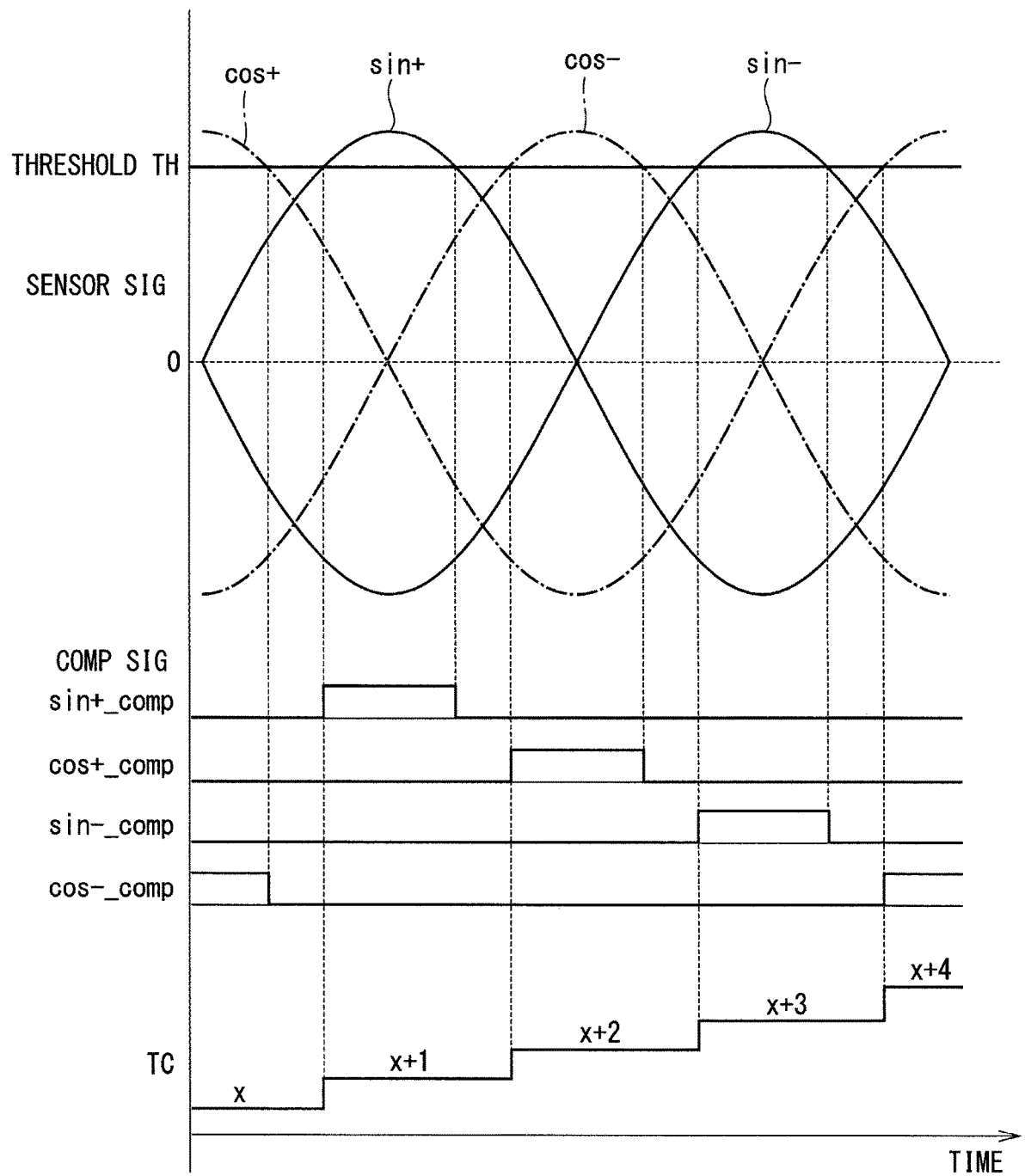
FIG. 9 is a time chart showing the sensor signal, the comparison signal, and the count value in the first embodiment.

As shown in FIG. 9, for example, the count value TC may be counted up or counted down when the comparison signal of the comparators 151-154 rises. FIG. 9 illustrates, in order from top to bottom, the sensor output, the comparison signal, and the count value TC. While the following description focuses mainly on the forward rotation of the motor 80 (i.e., the motor 80 rotating in the forward direction), it is understood that the following description may also be applied to the motor rotating in the reverse direction, where calculations and processes for the forward direction may be logically reversed or negated to obtain like results for the reverse direction.

Figure 10:
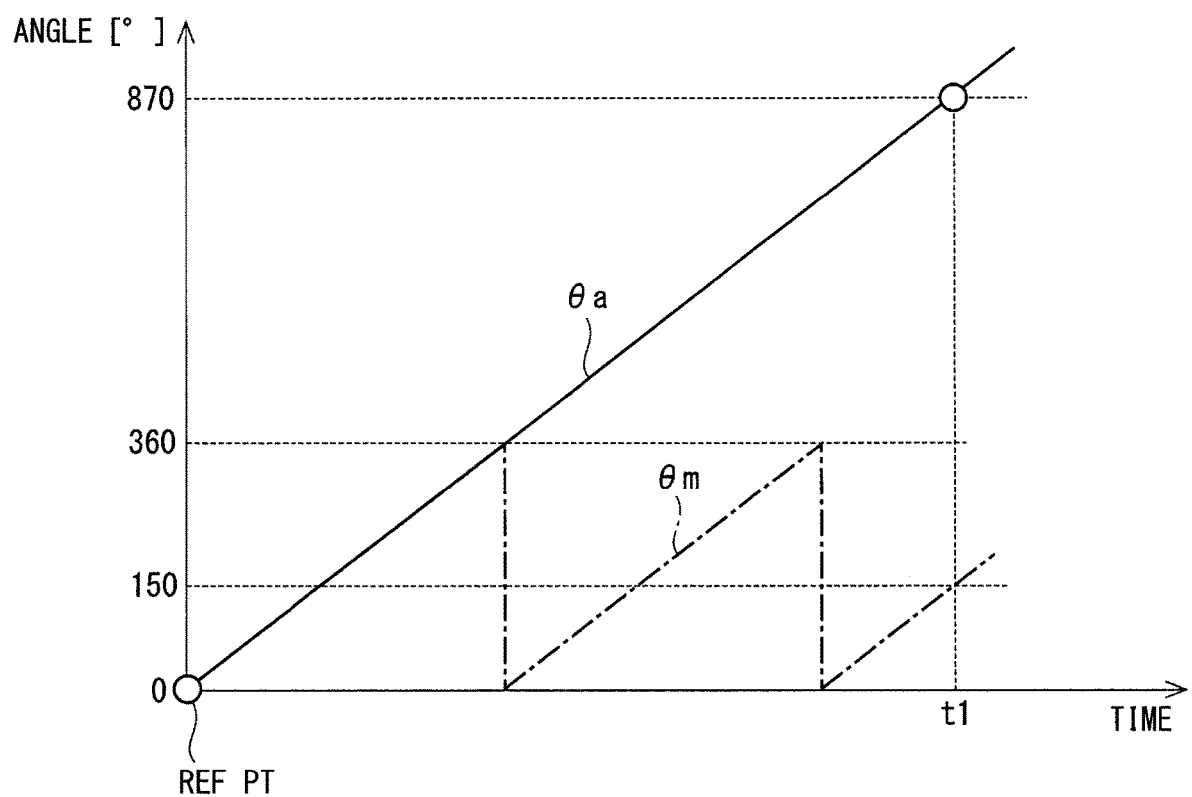
FIG. 10 is a time chart showing an electrical angle and the absolute angle in the first embodiment.

Here, the absolute angle θa is described. In the present embodiment, the count value TC and the mechanical angle θm are used to calculate an absolute angle θa. The absolute angle θa is an angle to which the motor 80 is rotated with respect to a certain reference point or reference position. For example, at time t1 shown in FIG. 10, the absolute angle θa is 870° when the mechanical angle θm is 150°, assuming a reference point of 0°. The absolute angle θa is 870° since the motor 80 has already rotated twice (i.e., 720°) from the reference point of 0°. The reference point may be a point other than 0°. The absolute angle θa can be calculated using equation (1-1) or equation (2-1). For purposes of calculating using equation (1-1) or equation (2-1), the example assumes a count value TC of 9 and a mechanical angle θm of 150°.

$$\theta a = TC \times 90° + MOD(\theta m, 90°) \qquad \text{Equation (1-1)}$$

In equation (1-1), MOD (θm,90°), where MOD is a modulo operation, means determining a remainder by dividing the mechanical angle θm by 90°. In this case, the remainder is 60°, so MOD (150°, 90°) is 60°. Equation (1-1) may be described as calculating how many number of rotations have already been performed based on the count value TC to determine where the rotation is generally, by determining in which one of the four regions (e.g., as shown in FIG. 6) the rotation position currently is. Equation (1-1) more specifically calculates where in that region the rotation position is at, based on the mechanical angle θm.

$$\theta a = DIV(TC/4) \times 360° + \theta m \qquad \text{Equation (2-1)}$$

DIV(TC/4) in equation (2-1), where DIV is an integer division operation, means a quotient obtained by dividing the count value TC by 4. In this example where the count value TC is 9, DIV(9/4) would be 2. Equation (2-1) determines how many times the motor 80 has rotated based on the count value TC, and then further determines the current rotation position based on the mechanical angle θm with reference to the reference point. As described above, the calculation results of equations (1-1) and (2-1) are the same. That is, either equation (1-1) or equation (2-1) may be used to calculate the absolute angle θa.

A post-shift mechanical angle θms, described below in greater detail, may be used in place of the mechanical angle θm in equations (1-1) and (2-1), where appropriate.

Figure 11:
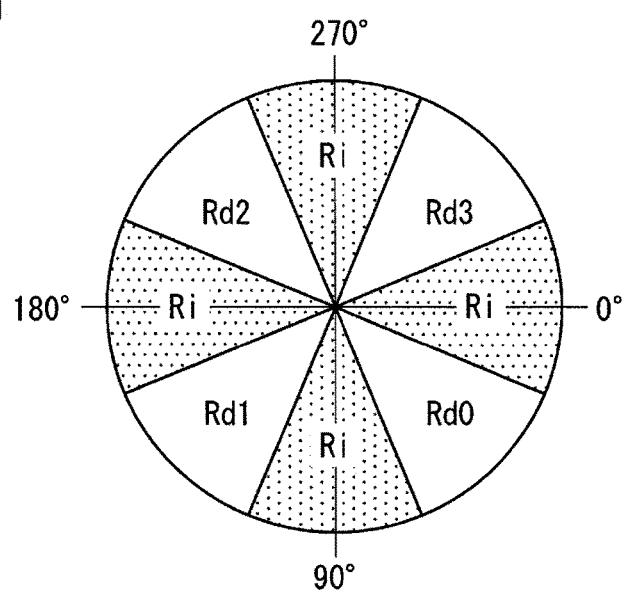
FIG. 11 illustrates definite regions and indefinite regions in the first embodiment.

During the counting of the count value TC, the count value TC may deviate from the true or actual count value TC due to deviations in the threshold value TH or sensor signal errors. As shown in FIG. 11, indefinite regions "Ri" may be designated as regions where the counting up or counting down of the count value may be performed. The indefinite region Ri is a region where the count value TC may deviate from an actual, true value depending on whether the counting up or the counting down of the count value TC has already occurred. The definite regions "Rd" (e.g., Rd0, Rd1) are regions where the count value TC can be definitely determined, and the counting up or the counting down of the count value is not performed. The definite regions Rd and the indefinite regions Ri may be determined, for example, based on the threshold values and detection errors. In the example of the comparison signals of the comparators 151-154 shown in FIG. 8, the indefinite region Ri may be from the falling edge of a detection signal until the next rising edge of the detection signal (i.e., the region between the falling edge and rising edge of a detection signal). When counting the count value TC by comparison with the threshold value TH of the sensor signal, the range including the mechanical angles θm of 0°, 90°, 180°, or 270° are in the indefinite regions Ri, as shown in FIG. 11. In FIG. 11, the indefinite regions Ri are shown with a dot hatching. The definite region within the region R0 is designated as Rd0, the definite region within the region R1 is designated as Rd1, the definite region within the region R2 is designated as Rd2, and the definite region within the region R3 is designated as Rd3.

When the count value TC has a true value "x" in the region R0, the count value TC may take the following possible values. When the motor 80 is rotating in the forward direction, if a count-up happens in the indefinite region between the region Rd0 and the region Rd1 (e.g., the count value TC may possible increment), the count value TC may possibly take a value of x+1. When the motor 80 is rotating in the reverse direction, if a count-down happens in the indefinite region between the region Rd0 and the region Rd3 (e.g., the count value TC may possibly decrement), the count value TC may possibly take a value of x−1. That is, three count values TC of x, x+1, or x−1 can be taken in the region R0. The same applies to the other regions.

During the transition from the region R3 to the region R0, for purposes of determining the count value TC, it is necessary to consider whether the mechanical angle θm has crossed 0° (i.e., is greater than 360° or a multiple thereof) in addition to considering whether count-up/down of the count value TC has been completed. When the motor 80 makes one rotation and the rotation angle (i.e., mechanical angle) θm transitions from 360° to 0°, the 360°/0° position may be referred to as the switch position, because the rotation angle θm switches from 360° to 0°. For example, when calculating the absolute angle θa by the equation (2-1), the absolute angle θa may be shifted by 360° from the true value depending on whether the mechanical angle θm has crossed 0° (i.e., depending on the true position of the mechanical angle θm relative to the switch position), as shown in FIG. 11. As a specific example, it is assumed that the mechanical angle θm is 340° and the count value TC is 3 in the region R3. The count value TC is 4 in the region R0 after transition (e.g., after the mechanical θm increases past 360° and passes 0°—that is, after the mechanical angle θm passes the switch position). The pre-count absolute angle θa in the region R3 is represented by equation (3), and the post-count absolute angle θa in the region R3 is represented by equation (4). The 360° shift in the absolute angle θa is noticeable between equations (3) and (4).

$$\theta a = DIV(3/4) \times 360 + 340 = 340 \qquad \text{Equation (3)}$$

$$\theta a = DIV(4/4) \times 360 + 340 = 700 \qquad \text{Equation (4)}$$

Consequently, in the present embodiment, the absolute angle θa is calculated when the mechanical angle θm is in the definite region Rd, and the absolute angle θa is not calculated when the mechanical angle θm is in the indefinite region Ri.

An absolute angle calculation process in the present embodiment is described with reference to the flowchart in FIG. 12. The absolute angle calculation process is performed by the absolute angle calculators 172 and 272 at a predetermined cycle. Since the calculations in the absolute angle calculators 172 and 272 are similar, the process is described with reference to the absolute angle calculator 172. However, the processes described with reference to the absolute angle calculator 172 in the first system L1 may also be applied to the absolute angle calculator 272 in the second system L2. The latter embodiments may also describe similar processes among the first system L1 and the second system L2, where the process is described with reference to only one of the systems. Unless described otherwise, the processes described with reference to one system may be applied to the other system, where such similar processes may substitute corresponding values from the other system, as appropriate.

Figure 12:
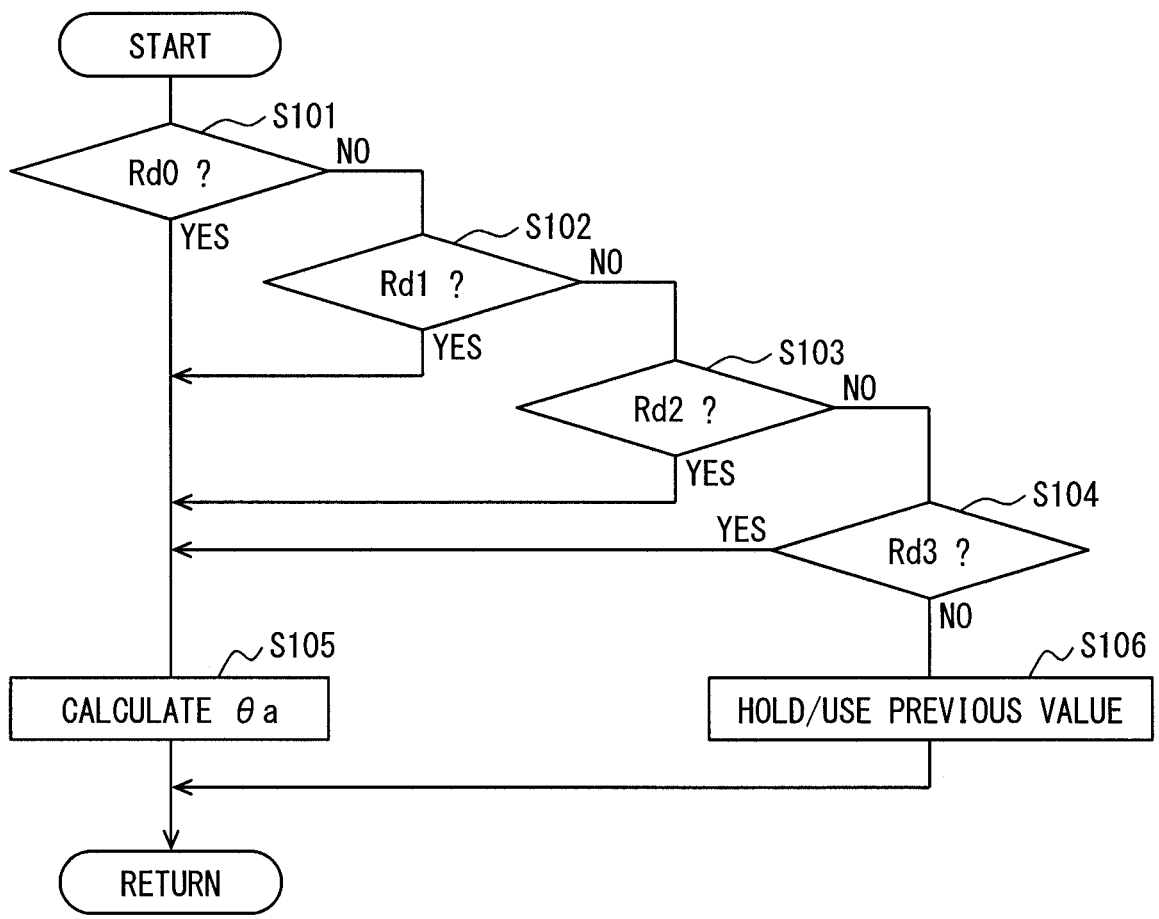
FIG. 12 is a flowchart showing an absolute angle calculation process in the first embodiment.

With reference to FIG. 12, at S101, the absolute angle calculator 172 determines whether the mechanical angle θm is within the definite region Rd0. When the absolute angle calculator 172 determines that the mechanical angle θm is within the definite region Rd0, i.e., "YES" at S101, the process proceeds to S105. When the absolute angle calculator 172 determines that the mechanical angle θm is not within the definite region Rd0, i.e., "NO" at S101, the process proceeds to S102.

At S102, the absolute angle calculator 172 determines whether the mechanical angle θm is within the definite region Rd1. When the absolute angle calculator 172 determines that the mechanical angle θm is within the definite region Rd1, i.e., "YES" at S102, the process proceeds to S105. When the absolute angle calculator 172 determines that the mechanical angle θm is not within the definite region Rd1, i.e., "NO" at S102, the process proceeds to S103.

At S103, the absolute angle calculator 172 determines whether the mechanical angle θm is within the definite region Rd2. When the absolute angle calculator 172 determines that the mechanical angle θm is within the definite region Rd2, i.e., "YES" at S103, the process proceeds to S105. When the absolute angle calculator 172 determines that the mechanical angle θm is not within the definite region Rd2, i.e., "NO" at S103, the process proceeds to S104.

At S104, the absolute angle calculator 172 determines whether the mechanical angle θm is within the definite region Rd3. When the absolute angle calculator 172 determines that the mechanical angle θm is within the definite region Rd3, i.e., "YES" at S104, the process proceeds to S105. When the absolute angle calculator 172 determines that the mechanical angle θm is not the definite region Rd3, i.e., "NO" at S104, the process proceeds to S106.

At S105, the absolute angle calculator 172 calculates the absolute angle θa using the count value TC and the mechanical angle θm. The absolute angle calculator 172 performs the process at S106 when the mechanical angle θm is in the indefinite regions Ri. At S106, the absolute angle calculator 172 does not calculate the absolute angle θa, but uses the previous absolute angle θa value stored in memory (i.e., a hold value). When S106 is performed right after a startup (i.e., immediately after a vehicle is started or the ignition switch is turned on), an initial value stored in memory is used as the absolute angle θa. As such, by using the initial value of the absolute angle θa stored in memory, the absolute angle calculator 172 can calculate the absolute angle θa without causing a 360° shift in the absolute angle θa (i.e., without causing a 360° offset error in the true value of the absolute angle θa).

As described above, the ECU 10 in the present embodiment includes the sensor sections 130 and 230 and the control sections 170 and 270. The sensor sections 130 and 230 detect the rotation of the motor 80, and output mechanical angles θm1 and θm2. The mechanical angles θm1 and θm2 are rotation angles during one rotation (e.g., between 0° and 360°). The sensor sections 130 and 230 also detect the count values TC1 and TC2 related to the number of rotations of the motor 80. In the present embodiment, the mechanical angles θm1 and θm2 may be referred to as "rotation angles" and "first rotation information." The count values TC1 and TC2 may be referred to as second rotation information. The count values TC1 and TC2 are for dividing one rotation of the motor 80 into a plurality of count regions and counting up (i.e., incrementing the count value) or counting down (i.e., decrementing the count value) when one count region transitions/switches to another count region depending on the rotation direction of the motor 80.

The control sections 170 and 270 have signal acquisition units 171 and 271 and absolute angle calculators 172 and 272. The signal acquisition units 171 and 271 acquire the mechanical angles θm1 and θm2 and the count values TC1 and TC2 from the sensor sections 130 and 230. The absolute angle calculators 172 and 272 calculate the absolute angles θa1 and θa2, which are rotation amounts from the reference position, based on the mechanical angles θm1 and θm2 and the count values TC1 and TC2.

In one rotation of the motor 80, there are indefinite regions Ri that may cause detection deviations (i.e., errors) of the count values TC1 and TC2, and definite regions Rd in which no detection deviation occurs. The absolute angle calculator 172 and 272 calculate the absolute angles θa1 and θa2 using the count values TC1 and TC2 in the definite region Rd.

In the present embodiment, the absolute angle calculators 172 and 272 calculate the absolute angles θa1 and θa2 based on the mechanical angles θm1 and θm2 and the count values TC1 and TC2 in the definite region Rd, and holds the absolute angles θa1 and θa2 when the mechanical angles θm1 and θm2 and the count values TC1 and TC2 are in the indefinite region Ri. "Holds," that is, "holding" the absolute angles θa1 and θa2, may mean that the absolute angle calculators 172 and 272 use a hold value, that is, a previous calculated or stored absolute angle value in memory as the absolute angles θa1 and θa2. By holding the absolute angles θa1 and θa2, that is, by using previous calculated or stored absolute angles θa1 and θa2 in memory, the absolute angle calculators 172 and 272 can appropriately calculate the absolute angles θa1 and θa2 when the mechanical angles θm1 and θm2 and the count values TC1 and TC2 are in the indefinite region Ri.

The electric power steering apparatus 8 includes the ECU 10 and the motor 80 that outputs a torque for assisting a steering operation of the vehicle. That is, the ECU 10 of the present embodiment can be applied to the electric power steering apparatus 8. Since the absolute angle θa is calculated by the ECU 10 of the present embodiment, the ECU 10 can calculate the steering angle by converting the absolute angle θa with the gear ratio of the speed-reduction gear 89 for transmitting the drive power of the motor 80 to the steering system 90. In such manner, the ECU 10 acts like a steering angle sensor, and the electric power steering apparatus 8 including the ECU 10 of the present embodiment can omit a steering angle sensor.

Second Embodiment

Figure 13:
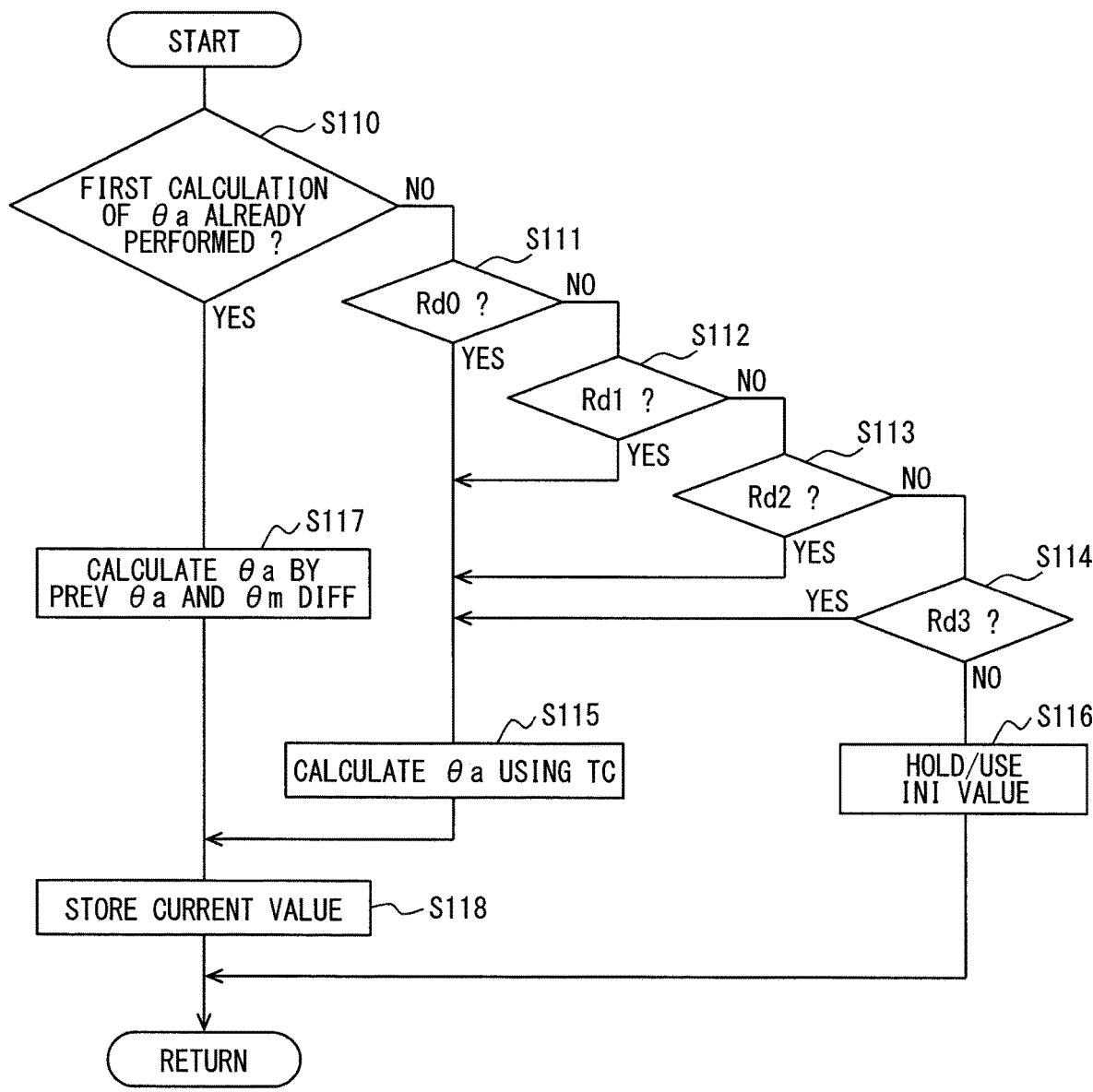
FIG. 13 is a flowchart showing an absolute angle calculation process in a second embodiment.

The absolute angle calculation process in the present embodiment is described with reference to FIG. 13. As shown in FIG. 13, at S110, the absolute angle calculator 172 determines whether a first calculation of the absolute angle θa has already been performed. Here, when the absolute angle θa using the count value TC is calculated in the definite region Rd after turning on the start switch of the vehicle such as an ignition switch, the first calculation is assumed to have been performed. In the present embodiment, turning on a start switch such or an ignition switch may be referred to as "system startup." When the absolute angle calculator 172 determines that the first calculation of the absolute angle θa has already been performed, i.e., "YES" at S110, the process proceeds to S117. When the absolute angle calculator 172 determines that the first calculation of the absolute angle θa has not yet been performed, i.e., "NO" at S110, the process proceeds to S111.

The processes at S111, S112, S113, and S114 (i.e., S111-S114) are similar to the processes at S101, S102, S103, and S104 in the first embodiment and shown in FIG. 12. When the absolute angle calculator 172 makes an affirmative determination that the mechanical angle θm is within a definite region Rd (e.g., Rd0-Rd3) in any of S111-S114, i.e., "YES" at S111-S114, the process proceeds to S115. At S115, the absolute angle calculator 172 calculates the absolute angle θa using the count value TC and the mechanical angle θm, similar to the process at S105 in the first embodiment. When the absolute angle calculator 172 makes a negative determination at any of S111-S114 and the determines that the mechanical angle θm is not within a definite region Rd but rather in an indefinite region Ri, i.e., "NO" at S111-S114, the process proceeds to S116. At S116, the absolute angle calculator 172 does not calculate the absolute angle θa but uses the initial value or a hold value of the absolute angle θa.

In instances where the absolute angle calculator 172 determines that the first calculation of the absolute angle θa has already been performed, i.e., "YES" at S110, the process proceeds to S117. At S117, the absolute angle calculator 172 calculates the absolute angle θa by adding a difference between mechanical angles θm to a previous calculation of the absolute angle θa. Here, the absolute angle calculator 172 calculates the current value of the absolute angle θa based on the previous value of the absolute angle θa and the difference between the current value of the mechanical angle θm and the previous value of the mechanical angle θm (i.e., the change amount of the mechanical angle θm), as shown in equation (5-1). In equation (5-1), the subscript (n) denotes the current value, and subscript (n−1) denotes the previous value.

$$\theta a_{(n)} = \theta a_{(n-1)} + (\theta m_{(n)} - \theta m_{(n-1)})  \quad \text{Equation (5-1)}$$

The absolute angle θa may be calculated from the absolute angle θa_init in the first calculation by adding the mechanical angle difference IΘmd from the first calculation. In equation 5-3, $\theta m_{(0)}$ denotes the mechanical angle at the time of absolute angle calculation using the count value TC, and $\theta m_{(1)}$ denotes the mechanical angle at the time of the first absolute angle calculation by adding the differences of the mechanical angles θm. Further, the mechanical angle differences value IΘmd may be obtained as a separately calculated value from such calculation. That is, the mechanical angle differences value IΘmd may be obtained by calculations other than equation 5-3.

$$\theta a_{(n)} = \theta a\_\text{init} + I\theta md \quad \text{Equation (5-2)}$$

$$I\theta md = (\theta m_{(1)} - \theta m_{(0)}) + \ldots + (\theta m_{(n-1)} - \theta m_{(n-2)}) + (\theta m_{(n)} - \theta m_{(n-1)}) \quad \text{Equation (5-3)}$$

At S118, the absolute angle calculator 172 stores the absolute angle θa calculated at S117 and the mechanical angles θm used in the calculation in memory (not shown). The stored absolute angle θa and mechanical angle θm values are used as by the absolute angle calculator 172 as the previous values in the second and subsequent calculations. The memory may be, for example, a volatile memory such as RAM for storing the latest values of the absolute angle θa and the mechanical angles θm.

In the present embodiment, the absolute angle calculator 172 calculates the absolute angle θa using the count value TC when the mechanical angle θm initially enters the definite region Rd. After making the initial absolute angle θa calculation using the count value TC, the absolute angle calculator 172 does not use the count value TC but rather calculates the absolute angle θa based on the first calculation absolute angle θa_init and the mechanical angles θm. Specifically, the absolute angle θa is calculated by adding the change amount of the mechanical angles θm to the absolute angle θa_init from the first calculation. In such manner, values in the indefinite region do not cause calculation errors, and the absolute angle calculator 172 can continue to make appropriate absolute angle calculations when the values are in the indefinite region Ri.

In the present embodiment, the absolute angle calculators 172 and 272 calculate the absolute angles θa1 and θa2 based on the mechanical angles θm1 and θm2 in the definite region Rd in the first calculation at system startup, and thereafter in the second and subsequent calculations, calculate the absolute angles θa1 and θa2 based on the first-calculated values of the absolute angles θa1 and θa2 and the mechanical angles θm1 and θm2. In such manner, in the second and subsequent calculations, the calculations of the absolute angles θa1 and θa2 can continue when the count value TC and mechanical angle θm are in the indefinite regions Ri. The present embodiment also provides the same advantageous effects as those described in the first embodiment.

Third Embodiment

Figure 14:
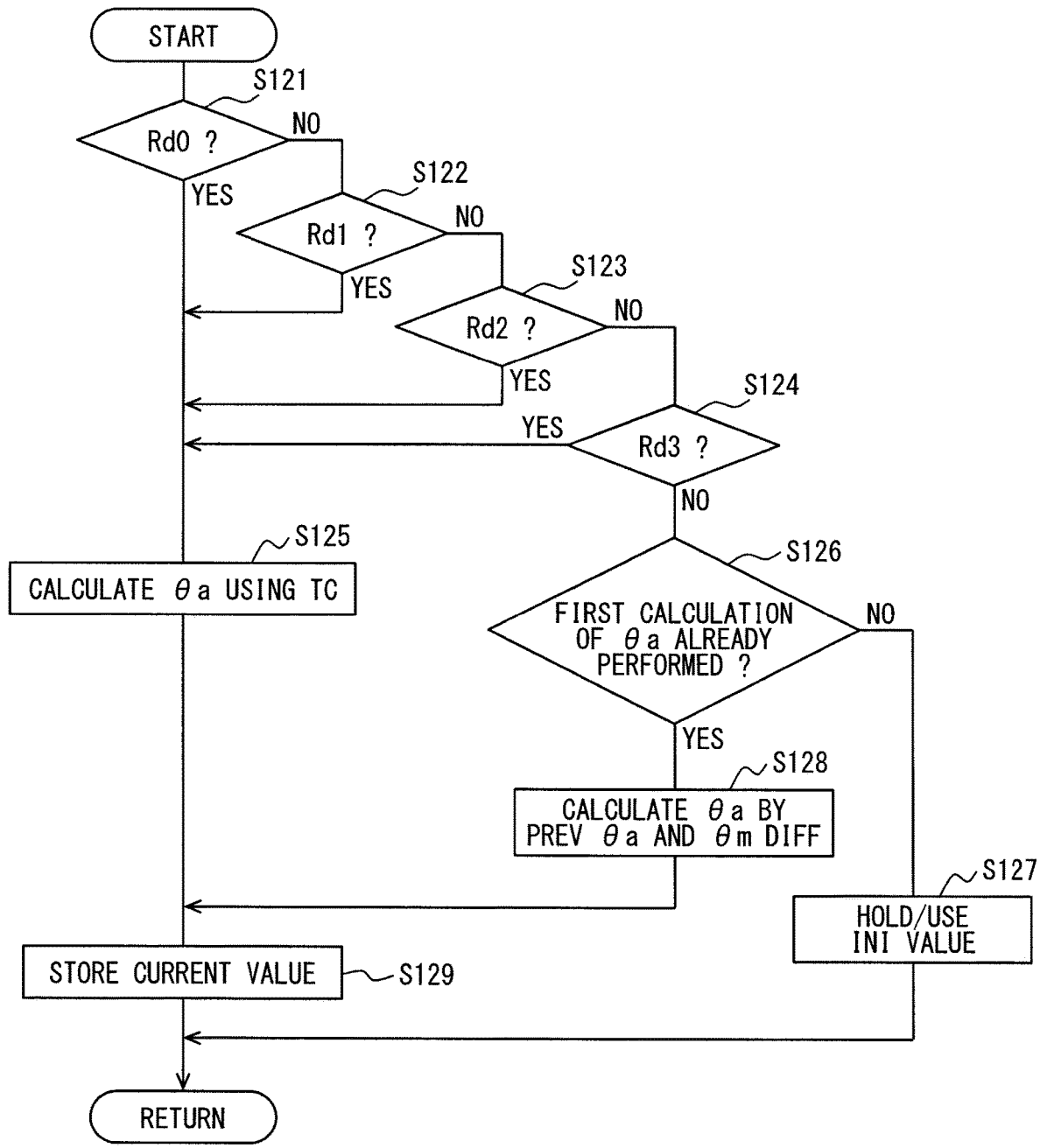
FIG. 14 is a flowchart showing an absolute angle calculation process in a third embodiment.

The absolute angle calculation process in the third embodiment is described with reference to FIG. 14. In FIG. 14, the processes performed by the absolute angle calculator 172 at S121, S122, S123, and S124 (i.e., S121-S124) are similar to the processes performed by the absolute angle calculator 172 at S101-S104 in FIG. 12 of the first embodiment. When the absolute angle calculator 172 makes an affirmative determination that the mechanical angle θm is within a definite region Rd (e.g., Rd0-Rd3) in any of S121-S124, i.e., "YES" at S121-S124, the process proceeds to S125. At S125, the absolute angle calculator 172 calculates the absolute angle θa using the count value TC and the mechanical angle θm, similar to the process at S105 in the first embodiment. When the absolute angle calculator 172 makes a negative determination at any of S121-S124 and determines that the mechanical angle θm is not within a definite region Rd but rather in an indefinite region Ri, i.e., "NO" at S121-S124, the process proceeds to S126.

At S126, similar to S110 in FIG. 13, the absolute angle calculator 172 determines whether the first calculation of the absolute angle θa has already been performed. When the absolute angle calculator 172 determines that the first calculation of the absolute angle θa has not yet been performed, i.e., "NO" at S126, the process proceeds to S127 and the absolute angle calculator 172 uses an initial value stored in memory, similar to the process at S116. When the absolute angle calculator 172 determines that the first calculation of the absolute angle θa has already been performed, i.e., "YES" at S126, the process proceeds to S128. At S128, similar to S117 in FIG. 13, the absolute angle calculator 172 calculates the absolute angle θa by adding the difference in mechanical angles θm to a previously calculated or stored absolute angle θa in memory. At S129, similar to S118, the absolute angle calculator 172 stores the calculated absolute angle θa and the mechanical angle θm in memory. That is, in the present embodiment, the absolute angle θa is calculated using the count value TC when the rotation angle θm and count value TC are in the definite region Rd, and the absolute angle θa is calculated by adding the mechanical angle θm difference to a previously stored/calculated absolute angle θa when the rotation angle the rotation angle θm and count value TC are in the indefinite region Ri.

In the present embodiment, in the second and subsequent calculations, the absolute angle calculator 172 calculates the absolute angles θa1 and θa2 based on the mechanical angles θm1 and θm2 and the count values TC1 and TC2 in the definite region Rd, and also calculates the absolute angles θa1 and θa2 based on the first calculation value of the absolute angles θa1 and θa2 and the mechanical angles θm1 and θm2, when the mechanical angles θm1 and θm2 and count values TC1 and TC2 are in the indefinite region Ri. In such manner, the absolute angle calculator 172 can continually calculate the absolute angles θa1 and θa2 in the indefinite region Ri in the second and subsequent calculations. The present embodiment provides the same advantageous effects as those described in the previous embodiments.

Fourth Embodiment

The fourth embodiment is described with reference to FIGS. 15, 16, 17, and 18. As described in the first embodiment, when counting the count value TC by comparing threshold values of the sensor signals, the indefinite regions Ri are disposed near the boundaries of the definite regions R0, R1, R2, and R3 (i.e., R0-R3), for example, as shown in FIG. 11. As described above, three count values TC may be taken in each of the regions R0-R3 (e.g., x−1, x, and x+1).

Figure 15:
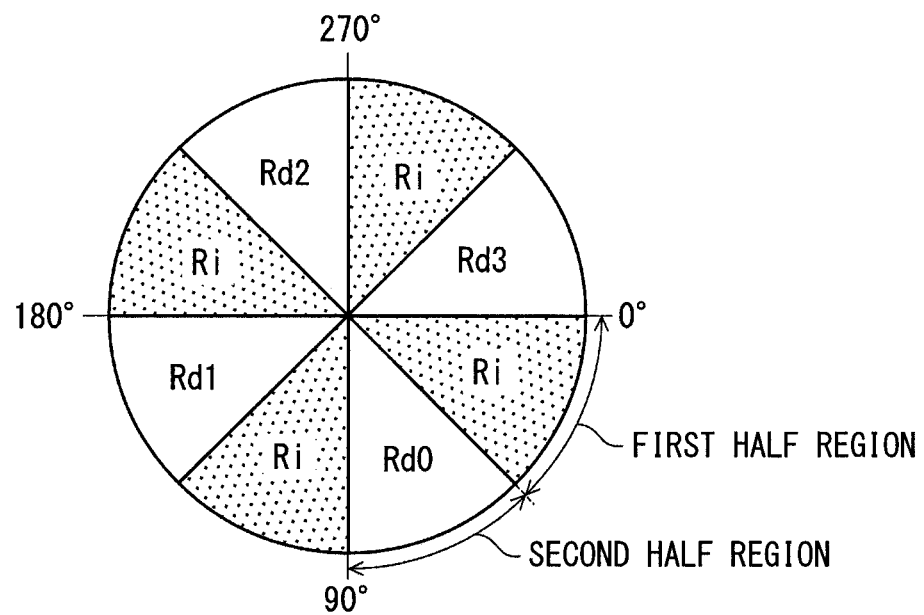
FIG. 15 illustrates definite regions and indefinite regions in a fourth embodiment.

In the present embodiment, the absolute angle calculator may perform a region correction process by adding an offset value a to the mechanical angle θm. In FIG. 15, by offsetting the mechanical angle θm, the absolute angle θa is offset by the amount of α. The offset value a is set to an arbitrary value according to the angular width of the indefinite region Ri such that the indefinite region Ri does not cross the boundary of any of the regions R0-R3. For example, as shown in FIG. 15, if the angular width of the indefinite region Ri is 45°, the offset value a is set to 22.5°, and the indefinite regions Ri are offset by 22.5° so as to not overlap any of the boundaries of the definite regions R0-R3.

By performing the region correction, when a count number of the region R0 is designated as x, the count value TC that can be taken in the region R0 is x or x−1. That is, when region correction is performed using the offset value α, the number of the count values TC that can possibly be taken in each of the regions R0 to R3 is two (i.e., x or x−1), which reduces the number of possible count values TC compared to cases without region correction. In this case, the region correction reduces the number of count values in each region from three (e.g., x−1, x, and x+1) to two (e.g., x−1 and x). The corrected mechanical angle θm is appropriately set with the offset value a as a post-shift mechanical angle θms after the shift (i.e., corrected by offsetting).

Figure 17:
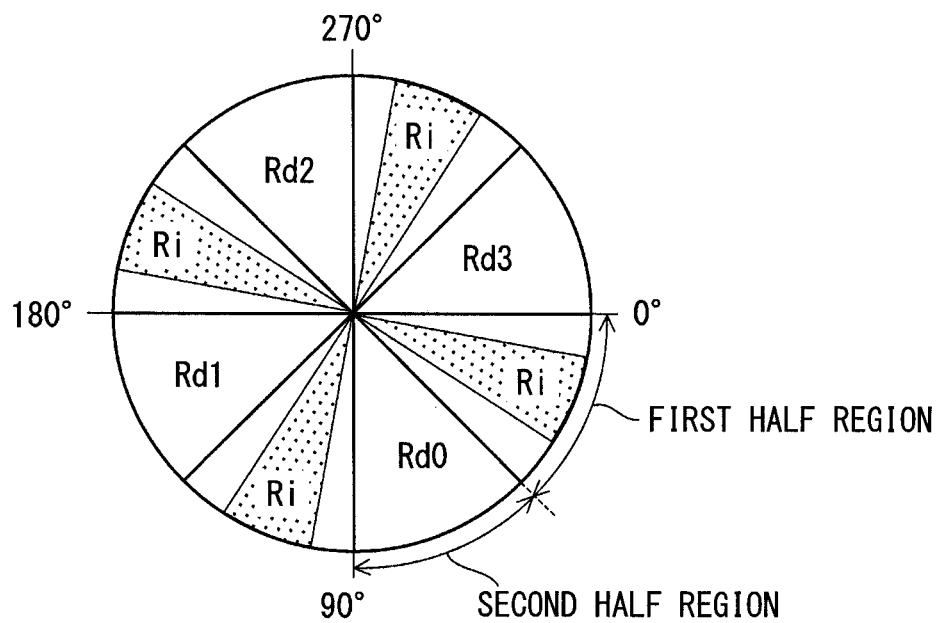
FIG. 17 illustrates definite regions and indefinite regions in the fourth embodiment.
Figure 16:
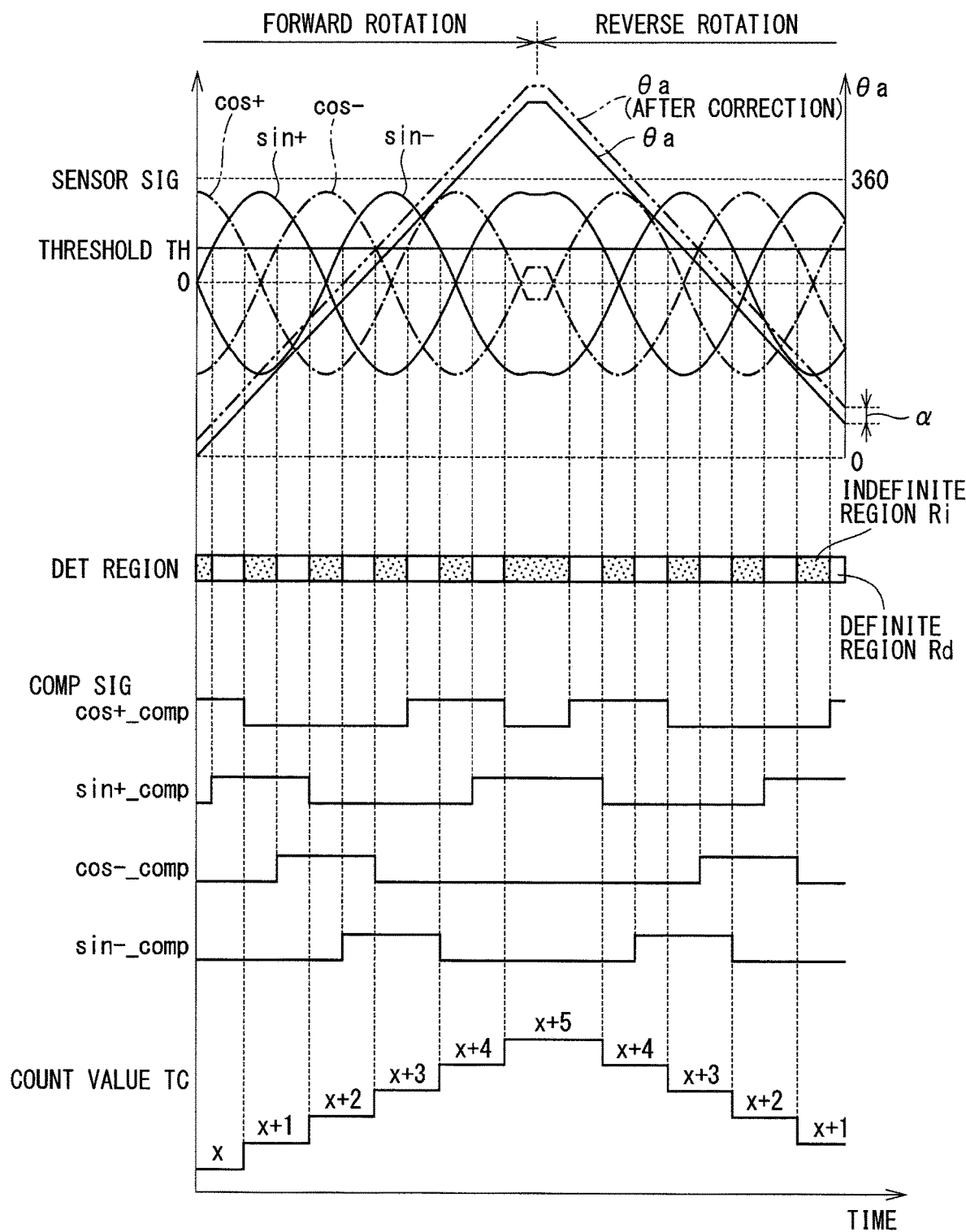
FIG. 16 is a time chart showing a sensor signal, an absolute angle, a determination region, a comparison signal, and a count value in the fourth embodiment.

As shown in FIGS. 15 and 17, in the present embodiment, each region is further divided into two sub-count regions. In FIG. 17, in region R0, the sub-count region having the smaller post-shift mechanical angle θms is defined as a first half region, and the sub-count region having the larger post-shift mechanical angle θms is set as a second half region. The first half region includes the indefinite region Ri, and the second half region does not include the indefinite region Ri. The same applies to the regions R1-R3.

In the present embodiment, the absolute angle θa is calculated in the second half region of each of the regions R0-R3 that does not include the indefinite region Ri. The absolute angle θa is not calculated in the first half region that includes the indefinite region Ri. In such case, it may also be regarded that the first half region is considered as the "indefinite region" and the second half region is considered as the "definite region." When the indefinite region Ri is included in the second half region and the indefinite region Ri is not included in the first half region, the calculation of the absolute angle θa may be performed by considering the first half region as the "definite region," and the second half region as the "indefinite region."

The absolute angle calculation process in the present embodiment is described with reference to a flowchart of FIG. 18. At S151, the absolute angle calculator 172 determines whether a remainder obtained by dividing the post-shift mechanical angle θms by 90° is larger than 45°. When it is determined that the remainder obtained by dividing the mechanical angle θms by 90° is larger than 45°, i.e., "YES" at S151, the absolute angle calculator 172 determines that the post-shift mechanical angle is in the definite region Rd and the process proceeds to S152. When the absolute angle calculator 172 determines that the remainder obtained by dividing the mechanical angle θm by 90° is not larger than 45°, i.e., "NO" at S151, the absolute angle calculator 172 determines that the angle θms is in the indefinite region Ri, and the process proceeds to S153.

At S152, the absolute angle calculator 172 calculates the absolute angle θa using the count value TC and the post-shift mechanical angle θms. At S153, similar to the process at S106, the absolute angle calculator 172 does not calculate the absolute angle θa, but uses the previous absolute angle θa value. When S153 is performed right after a startup, an initial value stored in memory is used as the absolute angle θa.

In the present embodiment, when region correction using the offset value a is performed and the count number in one rotation of the motor 80 is 4, one rotation of the motor 80 is divided into 8 regions (i.e., 2×4). The absolute angle calculator 172 calculates the absolute angle θa in a region that does not include the indefinite region Ri. In such manner, the angular deviation and error of the absolute angle θa can be made smaller than 90°. Since region correction using the offset value a makes the determination of the definite region Rd easier, the calculation load on the absolute angle calculator 172 and thus the control section 170 can be reduced to use less computational resources and make processing faster and more efficient.

In the present embodiment, when the rotation angle switch position where the mechanical angles θm1 and θm2 are switched from 360° to 0° is included in the indefinite region Ri, the control sections 170 and 270 shift the mechanical angles θm1 and θm2 so that the rotation angle switch position is located in the definite region Rd. In such manner, the region correction using the offset value a can reduce the number of possible count values TC1 and TC2 in each of the regions R0-R3.

The absolute angle calculators 172 and 272 divide each count region into a plurality of division regions (i.e., sub-count regions), and shift the mechanical angles θm1 and θm2 so that the indefinite region Ri is included in one of the division regions in the count region. As such, the absolute angle calculators 172 and 272 consider the division regions that do not include the indefinite regions Ri as the definite regions Rd. In the present embodiment, the number of divisions of each count region is 2, and one count region is divided into a first half region and a second half region. The mechanical angles θm1 and θm2 are shifted so that the indefinite region Ri is included in one of the first half region and the second half region, and the other one of the first half region and the second half region is considered as the definite region Rd. In such manner, the calculations for determining whether an angle is in the indefinite region Ri or in the definite region Rd can be simplified, and the calculation load on the absolute angle calculators 172 and 272 and thus control sections 170 and 270 can be reduced. In the present embodiment, the first half region and the second half region may be referred to as "sub-count regions," where the first half region may be referred to as a "part of the sub-count regions," and the second half region may be referred to as "other sub-count regions." The present embodiment also provides the same advantageous effects as those described in the previous embodiments.

Fifth Embodiment

Figure 19:
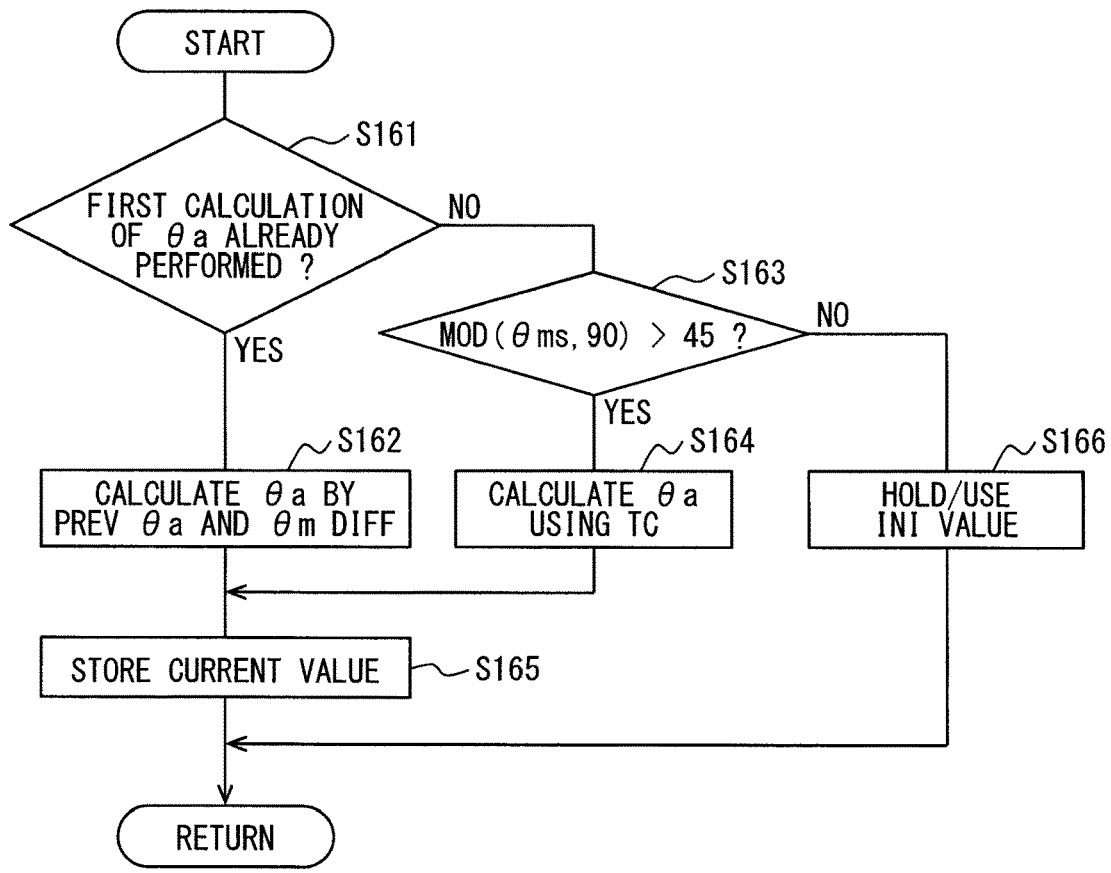
FIG. 19 is a flowchart showing an absolute angle calculation process in a fifth embodiment.

The absolute angle calculation process of the fifth embodiment is described with reference to FIG. 19. The process at S161 is similar to the process at S110 in FIG. 13. When the absolute angle calculator 172 determines that the first calculation of the absolute angle θa has already been performed, i.e., "YES" at S161, the process proceeds to S162, and the absolute angle θa is calculated by adding the mechanical angle θm difference to a previous absolute angle θa value, similar to the calculation performed by the absolute angle calculator 172 at S117. When the absolute angle calculator 172 determines that the first calculation of the absolute angle θa has not yet been performed, i.e. "NO" at S161, the process proceeds to S163.

Figure 18:
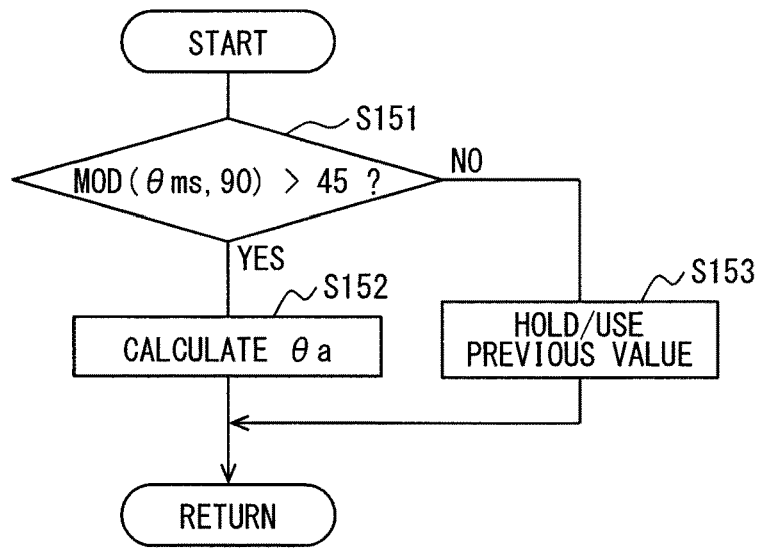
FIG. 18 is a flowchart showing an absolute angle calculation process in the fourth embodiment.

The process at S163 is similar to the process at S151 in FIG. 18. When the absolute angle calculator 172 determines that the remainder obtained by dividing the mechanical angle θm by 90° is greater than 45°, i.e., "YES" at S163, the absolute angle calculator 172 determines that the angle is in the definite region Rd and the process proceeds to S164. Similar to the process at S115 in FIG. 13, the count value TC and the mechanical angle θm are used to calculate the absolute angle θa. At S165, similar to the process at S118, the absolute angle calculator 172 stores the absolute angle θa calculated at S162 or S164 and the mechanical angle θm used in the calculation in memory. If the absolute angle calculator 172 determines that the remainder obtained by dividing the mechanical angle θm by 90° is not more than 45°, i.e., "NO" at S163, the process proceeds to S166. At S166, the absolute angle calculator 172 does not calculate the absolute angle θa and the initial value is held/used, similar to the process performed at S116 in FIG. 13. The configuration of the present embodiment also provides similar advantageous effects as those described in the previous embodiments.

Sixth Embodiment

Figure 20:
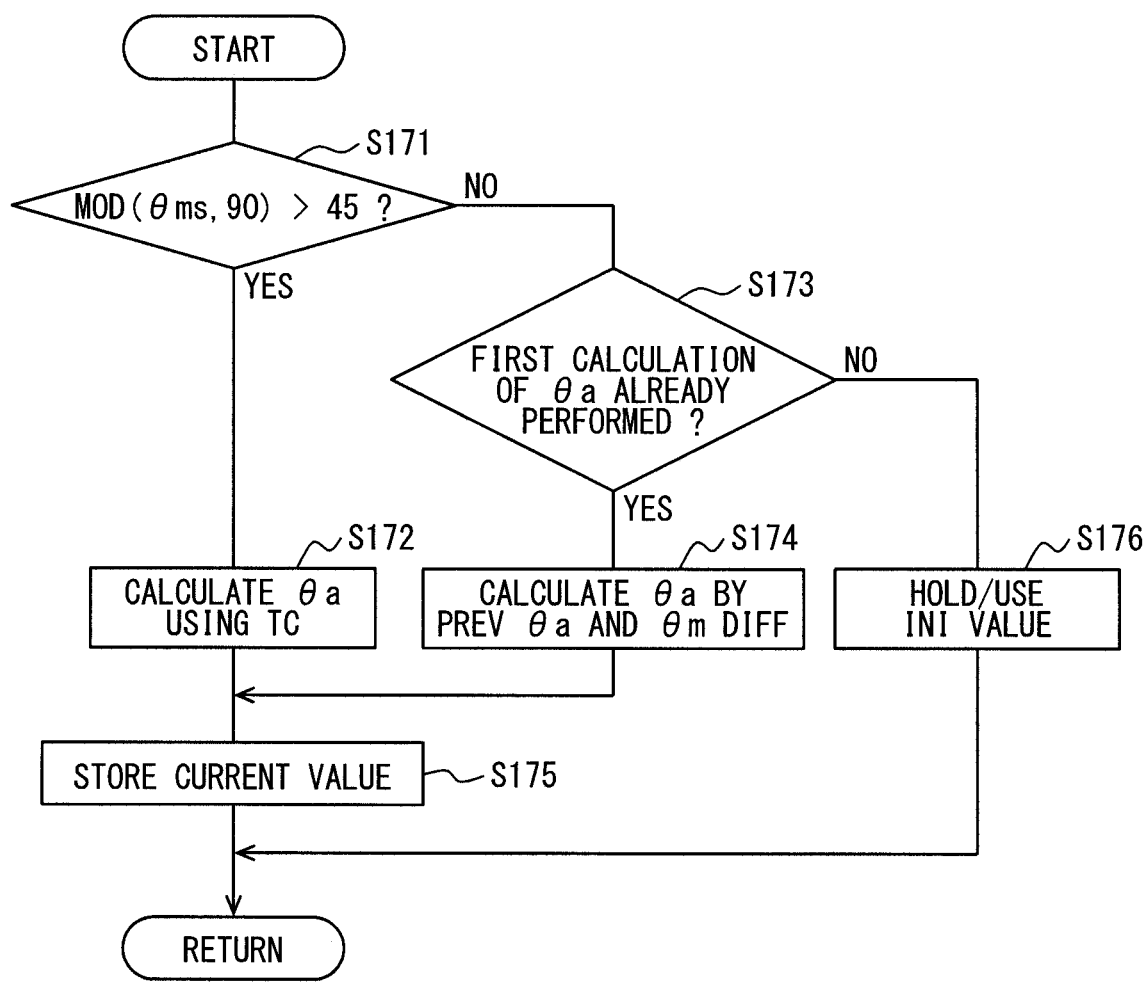
FIG. 20 is a flowchart showing an absolute angle calculation process in a sixth embodiment.

The absolute angle calculation process of the sixth embodiment is described with reference to FIG. 20. The process at S171 is similar to the process performed at S151 in FIG. 18. When the absolute angle calculator 172 determines that the remainder obtained by dividing the mechanical angle θm by 90° is greater than 45°, i.e., "YES at S171, the process proceeds to S172. At S172, the absolute angle calculator 172 calculates the absolute angle θa using the count value TC and the mechanical angle θm. When the absolute angle calculator 172 determines that the remainder obtained by dividing the mechanical angle θm by 90° is 45° or less, i.e. "NO" at S171, the process proceeds to S173.

The process at S173 is similar to the process S110 in FIG. 13. When the absolute angle calculator 172 determines that the first calculation of the absolute angle θa has already been performed, i.e., "YES" at S173, the process proceeds to S174 and the absolute angle calculator 172 calculates the absolute angle θa by adding the mechanical angle θm difference to a previous absolute angle θa value. At S175, similar to the process at S118, the absolute angle calculator 172 stores the absolute angle θa calculated at S172 or S174 and the mechanical angle θm used in the calculation. When the absolute angle calculator 172 determines that the first calculation of the absolute angle θa has not yet been performed, i.e. "NO" at S173, the process proceeds to S176, the absolute angle calculator 172 does not calculate the absolute angle θa, and the initial value is used. The configuration of the present embodiment also provides the similar advantageous effects as those described in the previous embodiments.

Seventh Embodiment

Figure 21:
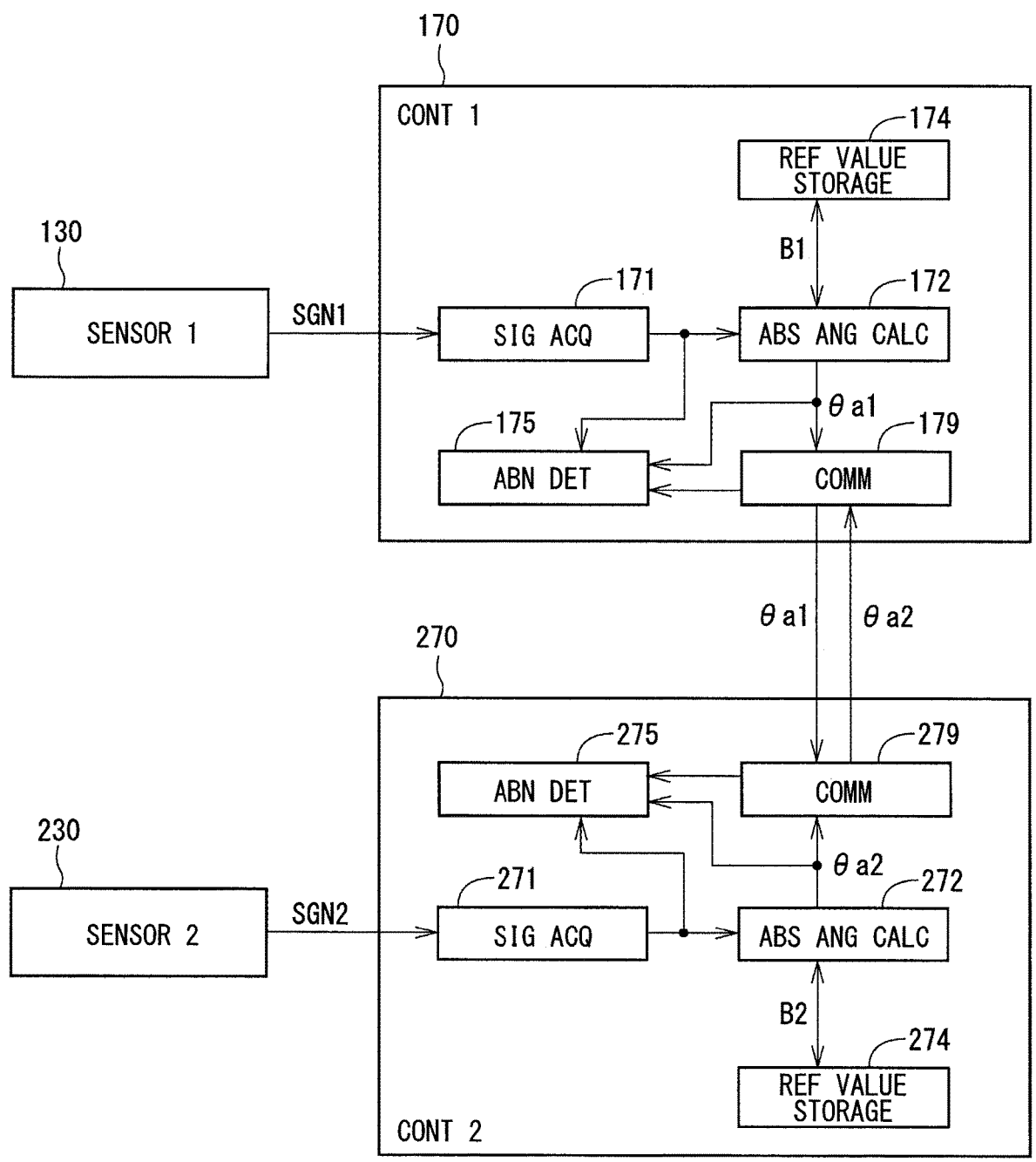
FIG. 21 illustrates a block diagram of a control section in a seventh embodiment.

The seventh embodiment is described with reference to FIGS. 21, 22, and 23A, 23B, 23C. As shown in FIG. 21, the first control section 170 of the present embodiment includes the signal acquisition unit 171, the absolute angle calculator 172, a reference value storage unit 174, the abnormality determiner 175, and the communicator 179. The second control section 270 includes the signal acquisition unit 271, the absolute angle calculator 272, a reference value storage unit 274, the abnormality determiner 275, and the communicator 279.

The reference value storage units 174 and 274 store reference values B1 and B2. The reference value storage units 174 and 274 are implemented by using a nonvolatile memory such as an EEPROM or a like memory, so that the reference values B1 and B2 are held in memory even when the start switch of the vehicle is turned off and the power supply to the first control section 170 and the second control section 270 is cut off. In the present embodiment, in addition to the mechanical angles θm1 and θm2 and the count values TC1 and TC2, the absolute angle calculators 172, 272 also use the reference values B1 and B2 for calculating the absolute angles θa1 and θa2.

The reference values B1 and B2 are set when the batteries 191 and 291 are connected and the start switch is first turned on. The first start of the vehicle after the batteries 191 and 291 are connected may be referred to as the "initial startup." The reference values B1 and B2 may be stored when the reference values B1 and B2 are first set (i.e., before the vehicle is first switched on), or the reference values B1 and B2 may be stored when the start switch is turned off for the first time after the initial startup, for example, during the manufacture of the vehicle. Among these two storage times, the reference values B1 and B2 may be better stored when the vehicle is first turned off after being turned on for the first time, because the memory notes that a memory rewrite has occurred and records the number of rewrites as one when the vehicle start switch is first turned on.

When an initialization instruction is used due to abnormality detection for initializing the reference values B1 and B2, or when an initial setting is performed during the vehicle manufacture or at the vehicle dealer, the calculation and storage of the reference values B1 and B2 may be performed. The first calculation after the above-described initialization instruction may also be included in the concept of the "initial startup." In the above description, the "initial startup" is described as turning on of the start switch for the first time after the connection of the batteries 191 and 291. In terms of system control for capturing abnormalities in the count values TC1 and TC2, "initial startup" may also be considered in cases where the power supplies 192 and 292 have abnormal voltages when the start switch is turned on, or if the sensor sections 130 and 230 have had a history of abnormalities when the start switch is switched on. That is, "initial startup" may not only mean the first time a vehicle is switched on after connecting the batteries 191 and 291, but may also include cases where there are abnormalities when the vehicle is switched on.

In the above-described embodiments, when the mechanical angles θm1 and θm2 are in the indefinite region Ri when the vehicle start switch is turned on, the absolute angle calculators 172 and 272 cannot perform the calculations of the absolute angles θa1 and θa2 until the mechanical angles θm and θm2 enter the definite regions Rd when the motor 80 is rotated. In the present embodiment, the reference values B1 and B2 are stored in the reference value storage units 174 and 274 at the initial startup after the batteries 191 and 291 are connected, and subsequently the absolute angle calculators 172 and 272 can calculate the absolute angles θa1 and θa2 immediately after the turning on of the start switch, regardless of the rotation position of the motor 80.

In the present embodiment, the count value TC at the initial startup is set as the initial count value TC_init, the mechanical angle θm at the initial startup is set as the initial mechanical angle θm_init, and the initial count value TC_init and the initial mechanical angle θm_init are stored as the reference value B.

Figure 22:
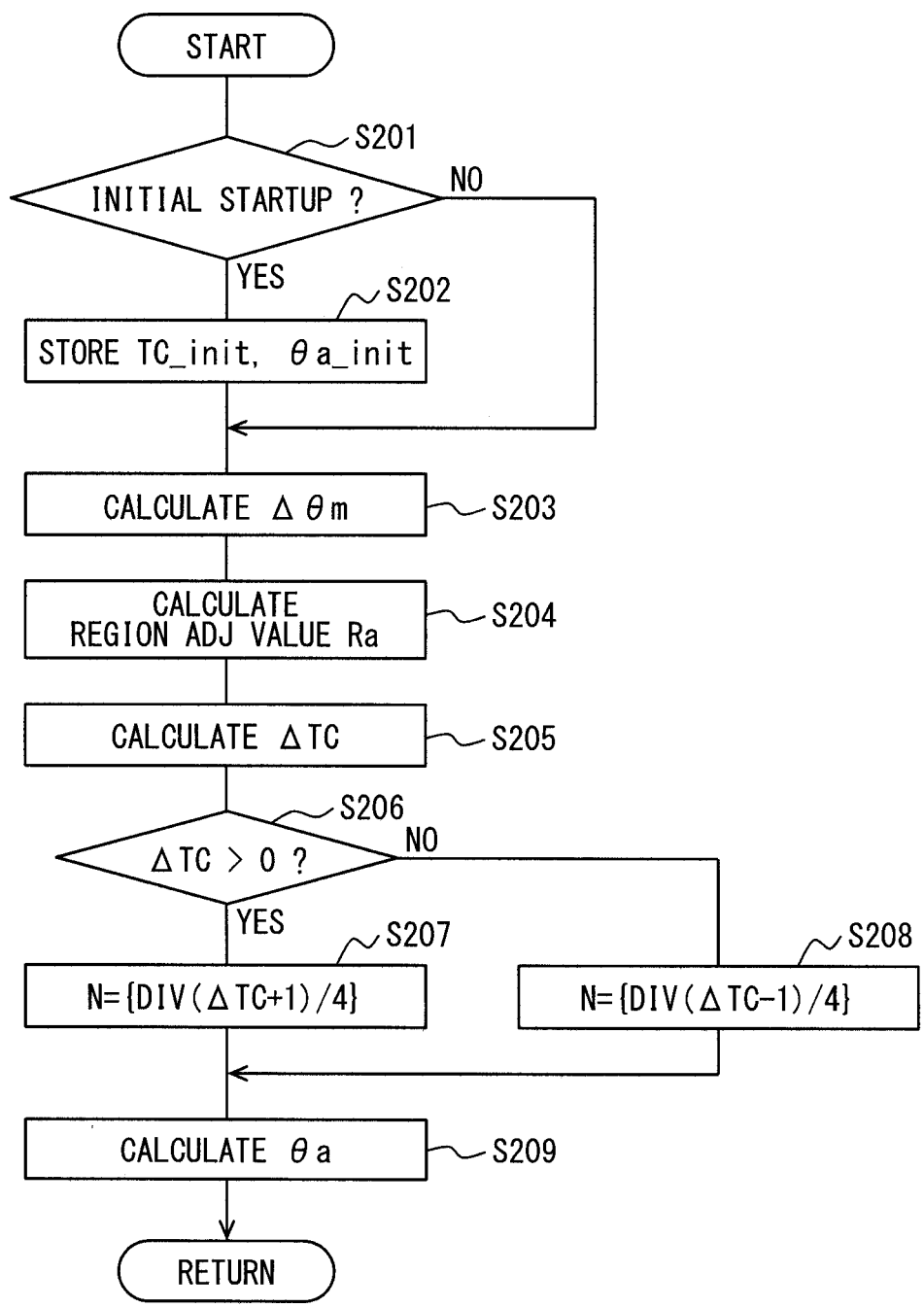
FIG. 22 is a flowchart showing an absolute angle calculation process in the seventh embodiment.

The absolute angle calculation process in the present embodiment is described with reference to a flowchart of FIG. 22. The process in FIG. 22 is performed by the control section 170 at a predetermined cycle. At S201, the absolute angle calculator 172 determines whether it is the initial startup after battery connection. When the absolute angle calculator 172 determines that it is not the initial startup after battery connection, i.e. "NO" at S201, process proceeds to S203. When the absolute angle calculator 172 determines that it is the initial startup after battery connection, i.e. "YES" at S201, the process proceeds to S202.

At S202, the absolute angle calculator 172 stores the current count value TC and the current mechanical angle θm in the reference value storage unit 174 as the initial count value TC_init and the initial mechanical angle θm_init.

At S203, the absolute angle calculator 172 calculates the mechanical angle deviation Δθm using equation (6). At S204, the absolute angle calculator 172 calculates a region adjustment value Ra using equation (7). At S205, the absolute angle calculator 172 calculates the count deviation ΔTC using equation (8). The count deviation ΔTC is a value indicating how much the count value TC has changed from the initial position. θm and TC in the equations respectively represent the current mechanical angle and the current count value. In equation (7), the quotient obtained by dividing the mechanical angle deviation Δθm by 90° is calculated, and the region adjustment value Ra can be considered as a value obtained by converting the mechanical angle deviation Δθm into the count number.

$$\Delta\theta m = \theta m - \theta m\_init \quad \text{Equation (6)}$$

$$Ra = \text{DIV}(\Delta\theta m/90°) \quad \text{Equation (7)}$$

$$\Delta TC = TC - TC\_init - Ra \quad \text{Equation (8)}$$

At S206, the absolute angle calculator 172 determines whether the count deviation ΔTC is greater than zero. When the absolute angle calculator 172 determines that the count deviation ΔTC is larger than 0, i.e. "YES" at S206, the process proceeds to S207. When the absolute angle calculator 172 determines that the count deviation ΔTC is less than or equal to 0, i.e. "NO" at S206, the process proceeds to S208.

At S207 and S208, the absolute angle calculator 172 calculates the number of rotations N. At S207, to prevent undercounting the number of rotations N, the absolute angle calculator 172 obtains a quotient by adding 1 to the count deviation ΔTC and dividing by 4 as the number of rotations N, as calculated in equation (9-1). In cases where there is no undercounting of the number of rotations N, the absolute angle calculator 172 rounds the number of rotations N after division by 4 (i.e., decimal fraction truncated). At S208, to prevent over counting the number of rotations N, the absolute angle calculator 172 obtains a quotient by subtracting 1 from the count deviation ΔTC and dividing by 4 as the number of rotations N, as calculated in equation (9-2). In cases where there is no over counting of rotations N, the absolute angle calculator 172 rounds the number of rotations N after division by 4 (i.e., decimal fraction truncated). At S209, the absolute angle calculator 172 calculates the absolute angle θa using the number of rotations N, as shown in (2-2).

$$N = \text{DIV}\{(\Delta TC + 1)/4\} \quad \text{Equation (9-1)}$$

$$N = \text{DIV}\{(\Delta TC - 1)/4\} \quad \text{Equation (9-2)}$$

$$\theta a = N \times 360° + \theta m \quad \text{Equation (2-2)}$$

Figure 23A:
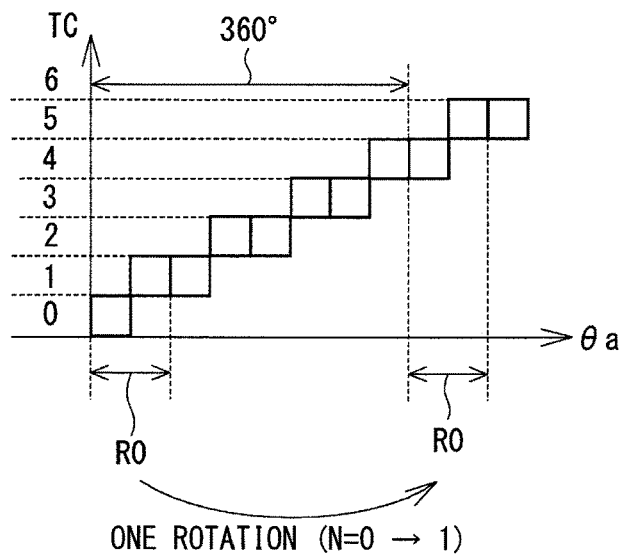
FIG. 23A illustrates a relationship between a count value and a number of rotations in the seventh embodiment.

In the present embodiment, the initial mechanical angle θm_init and the initial count value TC_init stored as the reference value B may be in the definite region Rd or the indefinite region Ri. As shown in FIG. 23A, when the initial position is in the indefinite region Ri and the count value TC is not yet counted, since the count-up happens in the region R0, the count number in the region R0 is 0 or 1 (i.e., indefinite). When the motor 80 returns to the region R0 after one rotation, the count value TC is 4 or 5.

Figure 23B:
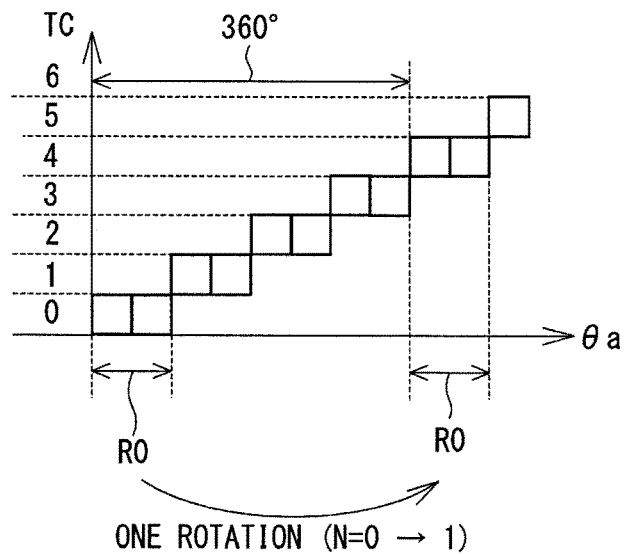
FIG. 23B illustrates another relationship between the count value and the number of rotations in the seventh embodiment.

As shown in FIG. 23B, when the initial position is in the definite region Rd and the count-up has already happened, the count number in the region R0 is zero (i.e., definite). Further, when the motor 80 returns to the region R0 after one rotation, the count value TC is 4.

Figure 23C:
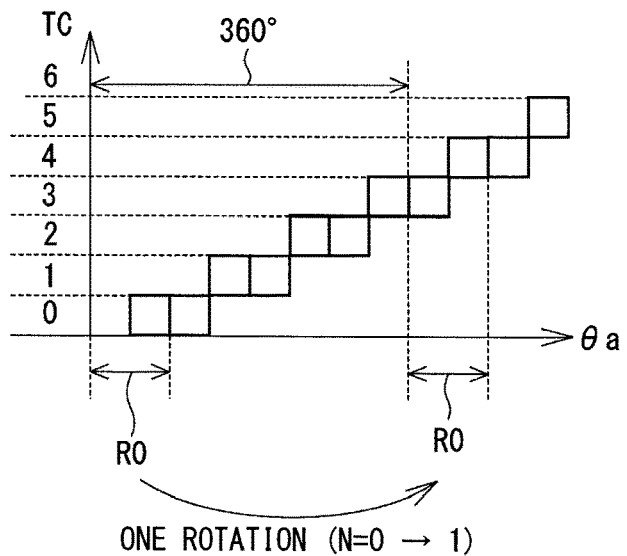
FIG. 23C illustrates yet another relationship between the count value and the number of rotations in the seventh embodiment.

As shown in FIG. 23C, when the initial position is in the definite region Rd and the count-up happens before crossing the region boundary, when the motor 80 returns to the region R0 after one rotation, the count value TC is 3 or 4.

In summary, based on FIGS. 23A, 23B, and 23C, when the motor 80 returns to the initial position, after one rotation from the initial position, regardless of whether the initial position is in the indefinite region Ri or in the definite region Rd, the count value TC is 4N±1. As such, by having the absolute angle calculator 172 perform the calculations at S206, S207, and S208 in FIG. 22, and by having the absolute angle calculator 172 calculate the absolute angle θa with equation (2-2), the absolute angle calculator 172 can calculate the absolute angle θa appropriately, regardless of whether the initial position is in the definite region Rd or in the indefinite region Ri.

In the present embodiment, the initial count value TC_init and the initial mechanical angle θm_init are stored in the reference value storage units 174 and 274 as the reference value B at the initial startup after the batteries 191 and 291 are connected. Thus, regardless of whether the mechanical angle θm is in the definite region Rd or in the indefinite region Ri, the absolute angle calculators 172 and 272 can calculate the absolute angle θa immediately after the start switch is turned on. In the present embodiment, since the reference value B is the count value TC and the mechanical angle θm at the time of initial startup, the calculation load on the absolute angle calculators 172 and 272 and thus the control sections 170 and 270 can be reduced. The configuration of the present embodiment provides the similar advantageous effects as those described in the previous embodiments.

Eighth Embodiment

Figure 24:
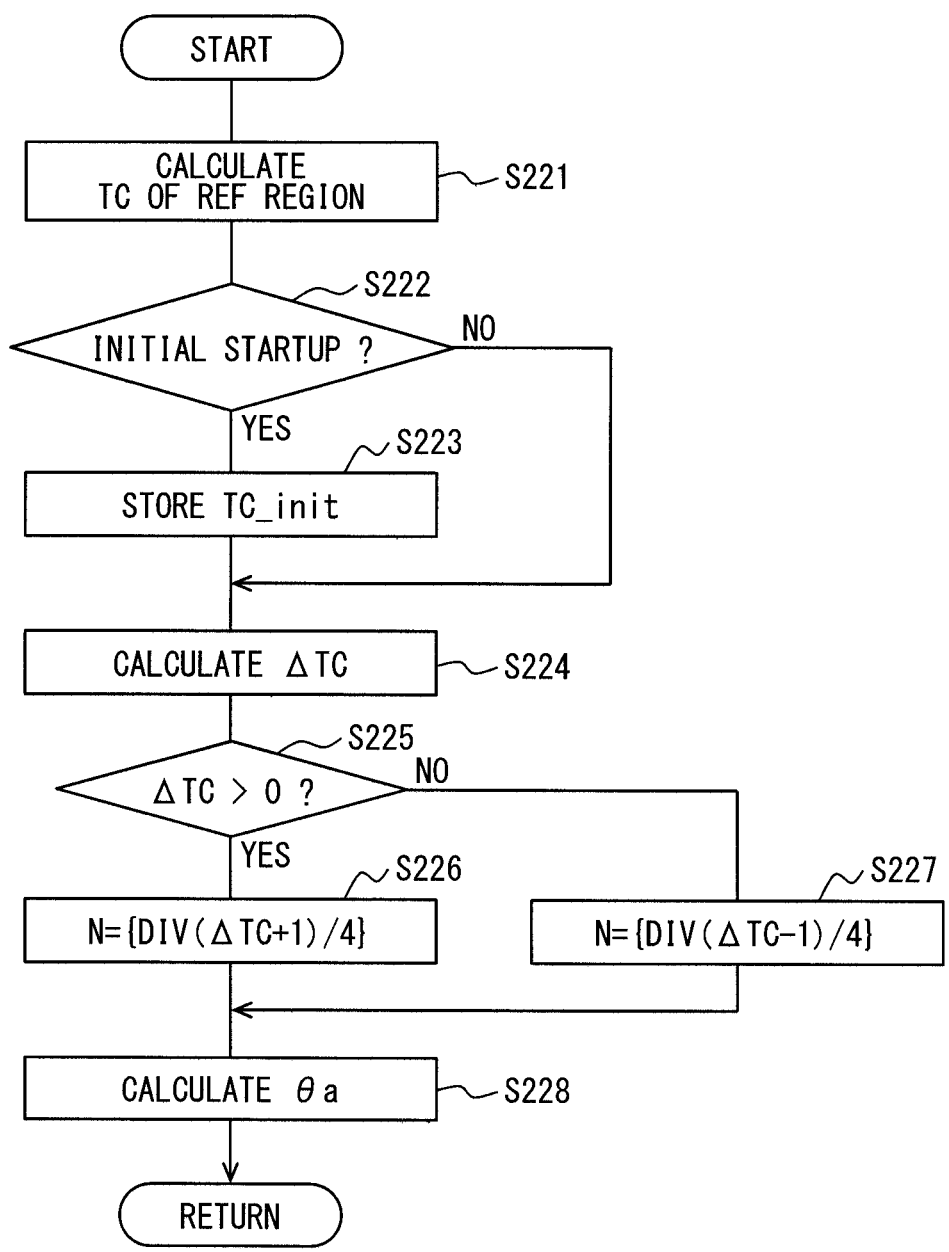
FIG. 24 is a flowchart showing an absolute angle calculation process in an eighth embodiment.

The eighth embodiment is described with reference to FIG. 24. The absolute angle calculation process in the present embodiment is described with reference to the flowchart in FIG. 24. At S221, the absolute angle calculator 172 calculates the count value TC of a reference region. In the present embodiment, the region R0 is set as the reference region, and the count value TC of the region R0 is calculated using equation (10). The count value TC of the region R0 is denoted as TC(R0).

$$TC_{(R0)}=TC-\text{MOD}(\theta ms,90°) \quad \text{Equation (10)}$$

The process at S222 is similar to the process at S201. When the absolute angle calculator 172 determines that the current process is not the initial startup, i.e., "NO" at S222, the process proceeds to S224. When that the absolute angle calculator 172 determines that the current process is the initial startup, i.e., "YES" at S222, the process proceeds to S223.

At S223, the absolute angle calculator 172 stores the initial count value TC_init of the region R0 (i.e., the reference region) as the reference value B in the reference value storage unit 174. At S224, the absolute angle calculator 172 calculates the count deviation ΔTC using equation (11). The processes at S225, S226, S227, and S228 are respectively similar to the processes at S206, S207, S208, and S209 in FIG. 22. At S228 the absolute angle calculator 172 calculates the absolute angle θa. In the present embodiment, the post-shift mechanical angle θms after shifting is used instead of the mechanical angle θm.

$$\Delta TC=TC_{(R0)}-TC\_\text{init} \quad \text{Equation (11)}$$

In the present embodiment, the absolute value calculator 172 calculates the number of rotations N in consideration of possible undercounts and over counts. As the absolute value calculator 172 calculates the absolute angle θa using the number of rotations N, the absolute value calculator 172 can appropriately calculate the absolute angle θa. The initial count value TC_init of the reference region is stored as the reference value B. As such, only one piece of data is stored, i.e., the reference value B. The present embodiment provides similar advantageous effects as those described in the previous embodiments.

Ninth Embodiment

Figure 25:
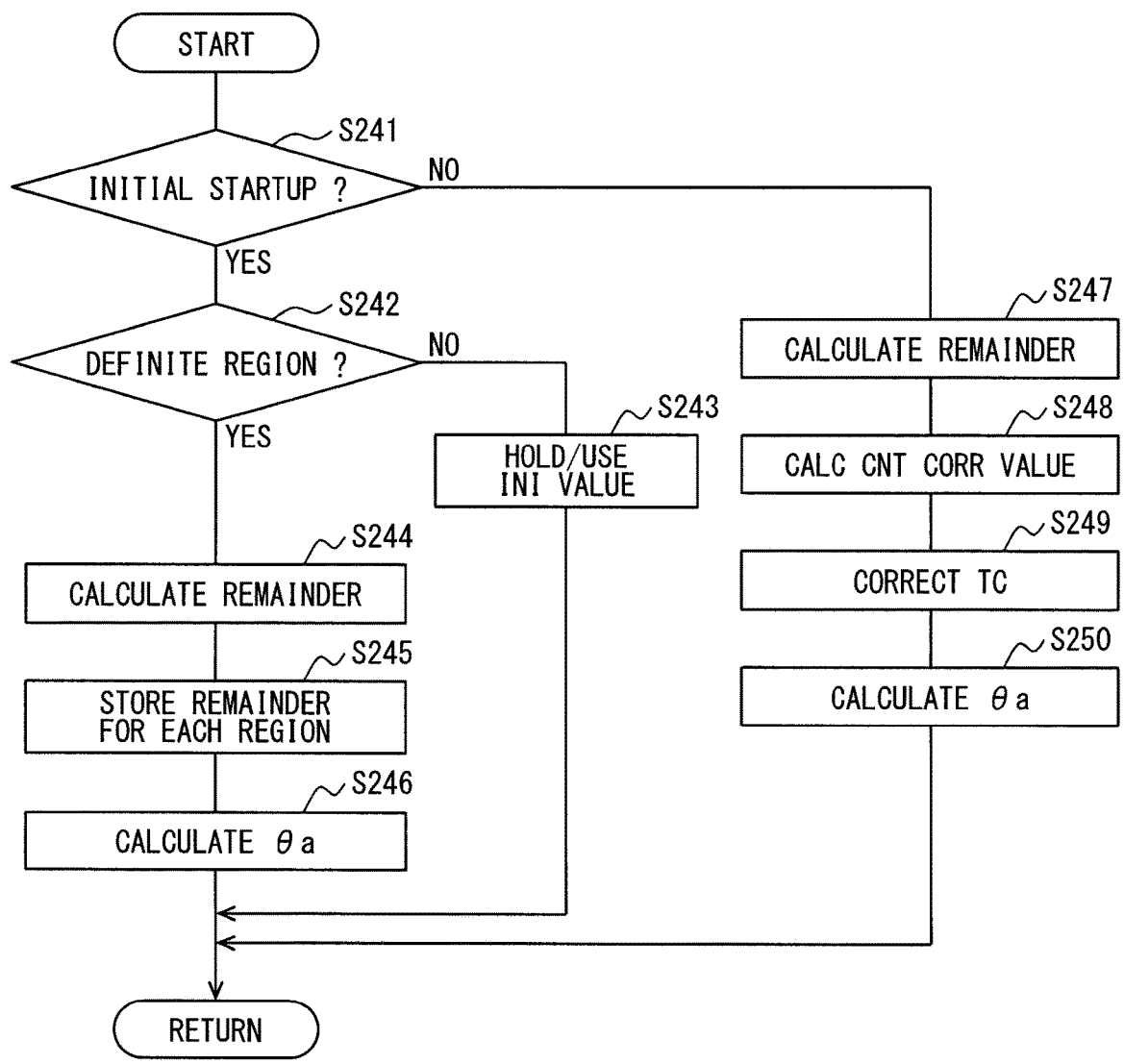
FIG. 25 is a flowchart showing an absolute angle calculation process in a ninth embodiment.

The absolute angle calculation process in the ninth embodiment is described with reference to the flowchart in FIG. 25. The process of S241 is similar to the process at S201. When the absolute angle calculator 172 determines that a vehicle start is not the initial startup, i.e. "NO" at S241, the process proceeds to S247. When the absolute angle calculator 172 determines that the vehicle start is the initial startup, i.e., "YES" at S241, the process proceeds to S242.

At S242, the absolute angle calculator 172 determines whether the post-shift mechanical angle θms is in the definite region Rd. When the absolute angle calculator 172 determines that the post-shift mechanical angle θms is not in the definite region Rd, "NO" at S242, the absolute angle calculator 172 determines that the post-shift mechanical angle θms is in the indefinite region Ri, the process proceeds to S243, and the absolute angle calculator 172 uses/holds the initial value. When the absolute angle calculator 172 determines that the post-shift mechanical angle θms is in the definite region Rd, i.e. "YES" at S242, the process proceeds to S244.

At S244, the absolute angle calculator 172 calculates a remainder value RM obtained by dividing the count value TC by the number of regions. When the remainder is 0, the remainder value RM is set to 4. At S245, the absolute angle calculator 172 sets an initial remainder value RM_init as the reference value B. The initial remainder value RM_init is the remainder value RM corresponding to the count value TC at the initial startup. The absolute angle calculator 172 then stores the reference value B in the reference value storage unit 174 in association with each of the regions R0-R3.

For example, when the current post-shift mechanical angle θms is in the region R0 and the count value TC is 47, the remainder value RM is 3, where an initial remainder value corresponding to the region R0 is RM_init$_{(R0)}$ is 3, an initial remainder value corresponding to the region R1 is RM_init$_{(R1)}$ is 4, an initial remainder value corresponding to the region R2 is RM_init$_{(R2)}$ is 1, and an initial remainder value corresponding to the region R3 is RM_init$_{(R3)}$ is 2. The absolute angle calculator 172 stores such values in the reference value storage unit 174. At S246, the absolute angle calculator 172 calculates the absolute angle θa using equation (1-2).

$$\theta a=TC\times 90+\text{MOD}(\theta ms,90°) \quad \text{Equation (1-2)}$$

In cases where the absolute angle calculator 172 determines that the vehicle start is not the initial startup, i.e., "NO" at S241, the process proceeds to S247. At S247, similar to the process at S244, the absolute angle calculator 172 calculates the remainder value RM. At S248, the absolute angle calculator 172 calculates the count adjustment value A using equation (12). The count adjustment value A is a value corresponding to the count deviation (i.e., a count error) between the initial position and the current position. RM_init$_{(Rx)}$ in equation (12) is an initial remainder value corresponding to the current region where the post-shift mechanical angle θms currently is. At S249, the absolute angle calculator 172 calculates the adjusted count value TC_a using equation (13). At S250, the absolute angle calculator 172 calculates the absolute angle θa using the adjusted count value TC_a using equation (1-3).

$$A=RM\_\text{init}_{(Rx)}-RM \quad \text{Equation (12)}$$

$$Tc\_a=TC+A \quad \text{Equation (13)}$$

$$\theta a=TC\_a\times 90°+\text{MOD}(\theta ms,90°) \quad \text{Equation (1-3)}$$

In the present embodiment, at the initial startup, the absolute angle calculator 172 stores the remainder value RM in the definite region of each of the four regions, and the absolute angle calculator 172 can appropriately calculate the absolute angle θa by correcting the count value TC with the stored value. By setting the reference value to be stored as the remainder value, the stored value is smaller compared to storing the count value TC itself. Here, the count value TC may be corrected based on the remainder value RM, so that the remainder value RM of the region R0 becomes zero. Then, just like the seventh embodiment or the eighth embodiment, by calculating the absolute angle θa using the number of rotations N after accounting for undercounts and over counts in the number of rotations N, the absolute angle calculator 172 can appropriately calculate the absolute angle θa regardless of whether the initial position is in the definite region Rd or in the indefinite region Ri. The present embodiment provides similar advantageous effects as those described in the previous embodiments.

Tenth Embodiment

Figure 26:
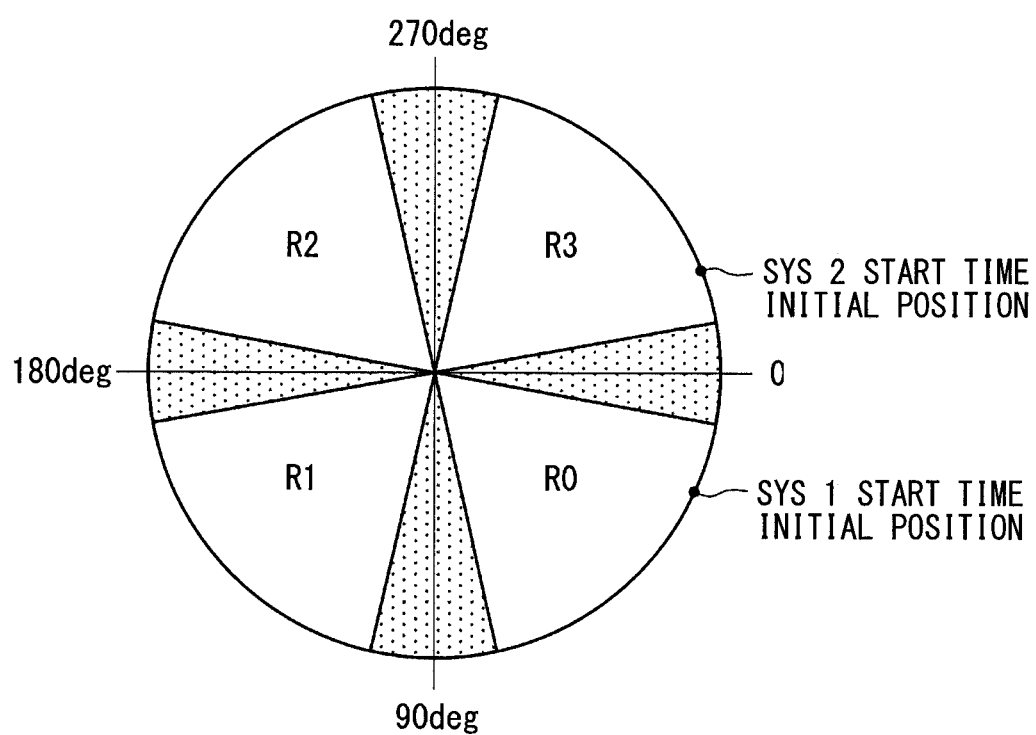
FIG. 26 illustrates an initial position difference among different systems in a tenth embodiment.

The tenth embodiment is described with reference to FIGS. 26 and 27. In the above-described embodiments, the method of calculating the absolute angle θa accurately in each system has been described. As shown in FIG. 26, when the initial position at the system start time differs depending on the system, there is a possibility that an error will occur in the absolute angle among the different systems. Therefore, in the present embodiment, error correction is performed by mutually transmitting (i.e., inter-system communication) the mechanical angle θm, the count value TC, or the absolute angle θa as the angle information. The angle information is also transmitted between the systems and used for detecting abnormalities.

Figure 27:
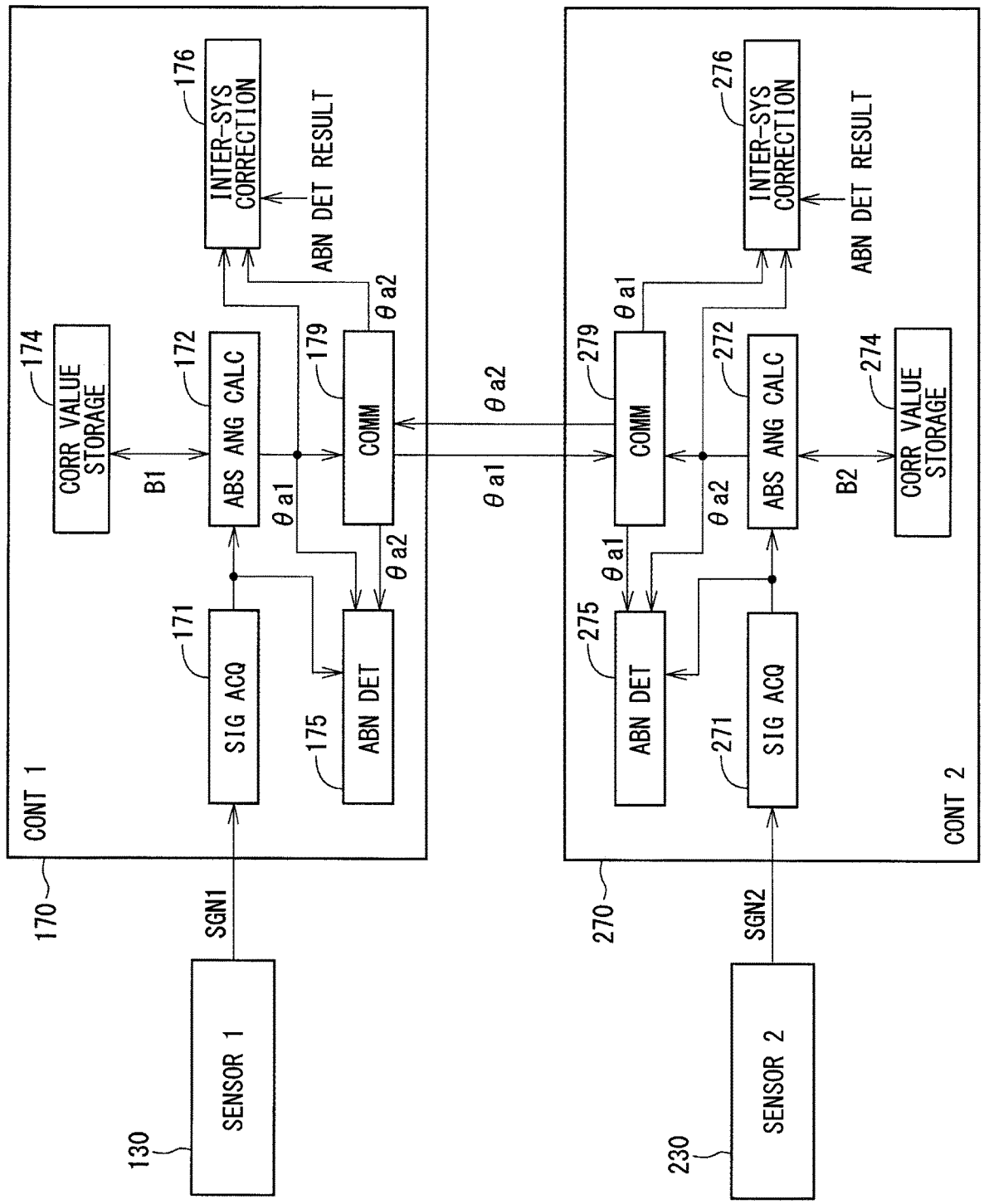
FIG. 27 illustrates a block diagram of a control section in the tenth embodiment.

As shown in FIG. 27, the first control section 170 includes the signal acquisition unit 171, the absolute angle calculator 172, the reference value storage unit 174, the abnormality determiner 175, an inter-system correction unit 176, and the communicator 179. The second control section 270 includes the signal acquisition unit 271, the absolute angle calculator 272, the reference value storage unit 274, the abnormality determiner 275, an inter-system correction unit 276, and the communicator 279. The inter-system correction units 176 and 276 calculate corrected absolute angles θa1_s and θa2_s based on the angle information of the subject system, the angle information of the other system, and an abnormality determination result of the other system.

The communicator 179 and 279 mutually transmit the absolute angles θa1 and θa2 as the angle information. If the absolute angles θa1 and θa2 are normal, the absolute angles θa1 and θa2 have substantially the same value. Therefore, when the absolute angles θa1 and θa2 are mutually transmitted as the angle information, the abnormality determiners 175 and 275 calculate an inter-system absolute angle deviation Δθax using equation (14), and, when the inter-system absolute angle deviation Δθax is greater than an abnormality determination threshold θa_th, the abnormality determiners 175 and 275 may determine that there are abnormalities in the absolute angles θa1 and θa2.

In the present embodiment, correction is made on the second system side, so that the corrected absolute angle θa2_s matches the absolute angle θa1. The inter-system correction unit 276 calculates the corrected absolute angle θa2_s based on the inter-system absolute angle deviation Δθax in equation (15). The inter-system correction unit 176 sets the absolute angle θa1 as it is (i.e., without change) as the corrected absolute angle θa1_s. In the inter-system correction units 176 and 276, any calculation for matching the two angles θa1_s and θa2_s may be performed. That is, for example, the average value of the absolute angles θa1 and θa2 before correction may be set as the corrected absolute angles θa1_s and θa2_s. Such variable correction methods may also be applied to correcting the number of rotations N and to the case of mutually transmitting the mechanical angles θm1 and θm2 and the count values TC1 and TC2.

If there is an abnormality on the first system side, the inter-system correction unit 276 sets the absolute angle θa2 as the corrected absolute angle θa2_s without performing an inter-system correction calculation. The inter-system correction units 176 and 276 output the corrected absolute angles θa1_s and θa2_s together with rotation angle abnormality information relating to the subject system or the other system.

$$\Delta\theta ax = \theta a2 - \theta a1 \qquad \text{Equation (14)}$$

$$\theta a2\_s = \theta a2 - \Delta\theta ax \qquad \text{Equation (15)}$$

As described above, the control sections 170 and 270 acquire the mechanical angles θm1c and θm2c for control processes and the mechanical angles θm1e and θm2e for abnormality detection. As such, the control sections 170 and 270 can already detect whether the subject system (i.e., first system L1 and second system L2) has abnormalities in the mechanical angle. In order to correct the error factor in the number of rotations N, the inter-system correction units 176 and 276 may calculate the inter-system rotation number deviation ΔN for calculating the corrected absolute angle θa2_s using equations (16) and (17). When θa1−θa2 in equation (16) is a value close to 360°, for example, 358°, a rounding adjustment that considers that ΔN=1 may be incorporated/programmed into the calculation.

$$\Delta N = \text{DIV}\{(\theta a1 - \theta a2)/360°\} \qquad \text{Equation (16)}$$

$$\theta a2\_s = \theta a2 - \Delta N \times 360° \qquad \text{Equation (17)}$$

In place of the absolute angles θa1 and θa2, the mechanical angles θm1 and θm2 and the count values TC1 and TC2 may be mutually transmitted as the absolute angle information. The count values TC1 and TC2 may be different depending on the initial position at the system start time. On the other hand, since the mechanical angles θm1 and θm2 are detected as the same rotor position, if they are normal, the mechanical angles θm1 and θm2 should take substantially the same value. Therefore, when the inter-system mechanical angle deviation Δθmx, as calculated by equation (18), is larger than the abnormality determination threshold θm_th, the abnormality determiners 175 and 275 can determine abnormalities in the mechanical angles θm1 and θm2.

The inter-system correction unit 276 calculates the corrected mechanical angle θm2_s using equation (20) and the corrected count value TC2_s using equation (21), based on the inter-system mechanical angle deviation Δθmx calculated by equation (18) and an inter-system count deviation ΔTCx using equation (19). In such manner, the corrected mechanical angle θm2_s matches the mechanical angle θm1 of the first system, and the corrected count value TC2_s matches the count value TC1 of the first system. The corrected absolute angle θa2_s calculated by using the corrected mechanical angle θm2_s and the corrected count value TC2_s matches the calculated absolute angle θa1 calculated by using the mechanical angle θm1 and the count value TC1 in the first system.

$$\Delta\theta mx = \theta m2 - \theta m1 \qquad \text{Equation (18)}$$

$$\Delta TCx = TC2 - TC1 \qquad \text{Equation (19)}$$

$$\theta m2\_s = \theta m2 - \Delta\theta m \qquad \text{Equation (20)}$$

$$TC2\_s = TC2 - \Delta TC \qquad \text{Equation (21)}$$

In such manner, the inter-system error of the absolute angles θa1 and θa2 can be reduced, and inconsistent control due to the inter-system error of the absolute angles θa1 and θa2 can be prevented. That is, by comparing the absolute angles θa1 and θa2, the control sections 170 and 270 of the current embodiment can appropriately detect abnormalities in the absolute angle information. As such, the current embodiment provides similar advantageous effects as those described in the previous embodiments.

Other Embodiments

In the above-described embodiments, the first rotation information is a mechanical angle and the second rotation information is a count value. In other embodiments, the first rotation information may be any value that can be converted to a mechanical angle. In other embodiments, the second rotation information may be any value that can be converted to the number of rotations. In the above-described embodiments, one rotation is divided into four regions, and the count value for one rotation of the motor is four. In other embodiments, one rotation may be divided into different numbers such as three, five, or more.

In the fourth embodiment, each count region is divided into two. In other embodiments, each count region may be divided into three or more regions, and the mechanical angle may be shifted so that an indefinite region is not included in at least one of the three or more divided regions.

In the above-described embodiments, two sensor sections and two control sections are provided for a dual system configuration. In other embodiments, the number of systems may be three or more, or one.

In the above-described embodiments, electric power is supplied to the first sensor section and the second sensor section from two separate batteries, and an output signal is transmitted from two sensor sections to two separate control sections. In other embodiments, electric power may be supplied from a single battery to a plurality of sensor sections. In such a case, a power source such as a regulator may be provided for each sensor section or may be shared among the sensor sections. In other embodiments, a plurality of sensor sections may respectively transmit an output signal to a single control section.

In other embodiments, the absolute angle information may be any value that can be converted to an absolute angle. For example, since the steering angle detected by the steering angle sensor can be converted into the absolute angle by the gear ratio of the speed-reduction gear, the steering angle information on the steering angle may be used as the absolute angle information. That is, in other words, the other system absolute angle is not necessarily limited to internal information obtained from inside the rotation detection device, but may also be obtained from outside the rotation detection device (e.g., an externally obtained value).

In the above-described embodiments, the sensor section is a detection element that detects a change in the magnetic field of the magnet. In other embodiments, other rotation angle detection methods and devices may be used such as a resolver or an inductive sensor. In addition, a communicator may be provided for transmitting each type of information type. For example, a first communicator may be provided for transmitting the first rotation information and a second communicator may be provided for transmitting the second rotation information.

In the above-described embodiments, the rotation number calculation is not performed based on the signal from the magnetic field detection unit for abnormality detection. In other embodiments, the rotation number calculation may be performed based on the signal from the magnetic field detection unit for abnormality detection, and the calculation result may be transmitted to the control section. In such manner, the inter-system correction and/or the abnormality monitoring by an inter-system comparison for the second system can be omitted.

In the above-described embodiments, the motor is a three-phase brushless motor. In other embodiments, the motor is not limited to a permanent magnet-type three phase brushless motor, and may be implemented as a motor of any type. The motor may also be a generator, or may be a motor-generator having both of a motor function and a generator function. That is, the rotating electric machine is not necessarily limited to a motor, but may be a motor, a generator, or a motor-generator.

In the above-described embodiments, a control device having the rotation detection device is applied to an electric power steering apparatus. In other embodiments, the control device having the rotation detection device may be applied to apparatuses other than an electric power steering apparatus.

The present disclosure is not limited to the embodiments described above, and various modifications may be implemented without departing from the spirit of the present disclosure.

What is claimed is:

1. A rotation detection device comprising:
 a sensor section configured to detect a rotation of a motor and to output first rotation information that includes a rotation angle of the motor within one rotation of the motor and second rotation information that includes a number of rotations of the motor; and
 a control section including:
  a signal acquirer configured to acquire the first rotation information and the second rotation information from the sensor section; and
  an absolute angle calculator configured to calculate an absolute angle indicative of a rotation amount from a reference position based on the first rotation information and the second rotation information; wherein
 the one rotation of the motor is divided into an indefinite region and a definite region, wherein the indefinite region is a region in which a detection deviation of the second rotation information occurs, and wherein the definite region is a region in which no detection deviation of the second rotation information occurs, and wherein
 the absolute angle calculator is further configured to calculate the absolute angle using the second rotation information from the definite region.

2. The rotation detection device of claim 1, wherein the absolute angle calculator is further configured to calculate the absolute angle
 (i) in a first calculation after system startup, based on the first rotation information and the second rotation information from the definite region, and
 (ii) in subsequent calculations after the first calculation, based on the absolute angle calculated in the first calculation and the first rotation information.

3. The rotation detection device of claim 1, wherein the absolute angle calculator is further configured to calculate the absolute angle
 (i) in a first calculation after system startup, based on the second rotation information and the first rotation information from the definite region, and,
 (ii) in subsequent calculations after the first calculation, based on the first rotation information and the second rotation information when the rotation angle of the motor is in the definite region, or the absolute angle calculated in the first calculation and the first rotation information when the rotation angle of the motor is in the indefinite region.

4. The rotation detection device of claim 1, wherein
the absolute angle calculator is further configured to calculate the absolute angle based on the first rotation information and the second rotation information from the definite region, and use a previously calculated absolute angle value to calculate the absolute angle when the rotation angle of the motor is in the indefinite region.

5. The rotation detection device of claim 1, wherein
in response to a switch position of the rotation angle where the rotation angle switches from 360 degrees to 0 degrees is included in the indefinite region, the control section is configured to control the offset of the rotation angle to shift the switch position to the definite region.

6. The rotation detection device of claim 1, wherein
the second rotation information is a count value based on count regions that divide the one rotation of the motor, the count value incrementing or decrementing in response to the rotation angle transitioning from one count region to another count region based on a rotation direction of the motor.

7. The rotation detection device of claim 6, wherein
the absolute angle calculator is further configured to
   divide each count region into a plurality of sub-count regions, and
   shift the rotation angle to move the indefinite region into one of the plurality of sub-count regions so that the indefinite region is included in the one of the plurality of the sub-count regions, and wherein
the other of the plurality of sub-count regions not including the indefinite region are definite regions.

8. An electric power steering apparatus comprising:
a rotation detection device; and
a motor for outputting a steering torque for a steering operation of a vehicle, wherein
the rotation detection device includes:
   a sensor section configured to detect a rotation of the motor and to output first rotation information that includes a rotation angle of the motor within one rotation of the motor and second rotation information that includes a number of rotations of the motor; and
   a control section including:
      a signal acquirer configured to acquire the first rotation information and the second rotation information from the sensor section; and
      an absolute angle calculator configured to calculate an absolute angle indicative of a rotation amount from a reference position based on the first rotation information and the second rotation information; wherein
the one rotation of the motor is divided into an indefinite region and a definite region, wherein the indefinite region is a region in which a detection deviation of the second rotation information occurs, and wherein the definite region is a region in which no detection deviation of the second rotation information occurs, and wherein
the absolute angle calculator is further configured to calculate the absolute angle using the second rotation information from the definite region.

* * * * *